(12) United States Patent
Konz et al.

(10) Patent No.: US 7,581,031 B2
(45) Date of Patent: Aug. 25, 2009

(54) SYSTEM AND METHOD FOR MAINTAINING PROPER TERMINATION AND ERROR-FREE COMMUNICATION IN A NETWORK BUS

(75) Inventors: Daniel W. Konz, Florissant, MO (US); Philip J. Ellerbrock, St. Peters, MO (US)

(73) Assignee: The Boeing Company, Seattle, WA (US)

( * ) Notice: Subject to any disclaimer, the term of this patent is extended or adjusted under 35 U.S.C. 154(b) by 1089 days.

(21) Appl. No.: 10/475,475

(22) PCT Filed: Apr. 26, 2002

(86) PCT No.: PCT/US02/13246

§ 371 (c)(1),
(2), (4) Date: Oct. 20, 2003

(87) PCT Pub. No.: WO02/088972

PCT Pub. Date: Nov. 7, 2002

(65) Prior Publication Data

US 2004/0153870 A1 Aug. 5, 2004

(51) Int. Cl.
*G06F 15/177* (2006.01)
(52) U.S. Cl. .................. 709/250; 709/224; 709/223; 710/100; 710/305; 714/47; 714/57; 713/324; 713/260
(58) Field of Classification Search ............. 709/250, 709/223, 224; 710/305, 100; 714/6, 47, 714/57; 713/324, 260
See application file for complete search history.

(56) References Cited

U.S. PATENT DOCUMENTS 4,137,562 A 1/1979 Boeck et al.

(Continued)

FOREIGN PATENT DOCUMENTS

DE 37 26 742 A1 2/1989

(Continued)

OTHER PUBLICATIONS

Infineon: *C167CR 16-Bit Single-Chip Microcontroller*; Apr. 2000; 72 pages; XP-002201995; Published by Infineon Technologies AG.

(Continued)

*Primary Examiner*—Nathan J Flynn
*Assistant Examiner*—Mohammad A Siddiqi
(74) *Attorney, Agent, or Firm*—Alston & Bird LLP

(57) ABSTRACT

A system for maintaining proper termination and error-free communication in a network bus (12) including a power bus includes at least one network device (18), a network controller (14) and at least on bus protection element. The network devices (18) are electrically connected to and adapted to communicate via the network bus (12). The network controller (14), in turn, is electrically connected to the network bus (12) and is adapted to direct communications with the network devices (18) via the network bus (12). The network controller (14) is also adapted to provide power signals to the network devices (18) via the power bus of the network bus (12). The network controller (14) and/or the bus protection elements can monitor signals on the network bus (12). And based upon the network controller (14) and/or bus protection elements identifying a predefined number of improper signals, the bus protection elements can selectively connect and disconnect respective network devices (18) to and from the network.

13 Claims, 13 Drawing Sheets

U.S. PATENT DOCUMENTS

| | | | |
|---|---|---|---|
| 4,304,001 | A | 12/1981 | Cope |
| 4,623,884 | A | 11/1986 | Ihara et al. |
| 4,688,168 | A | 8/1987 | Gudaitis et al. |
| 4,942,571 | A | 7/1990 | Möller et al. |
| 4,963,763 | A | 10/1990 | Minagawa et al. |
| 4,969,147 | A | 11/1990 | Markkula, Jr. et al. |
| 4,996,684 | A | 2/1991 | Morley et al. |
| 5,138,709 | A | 8/1992 | Jones et al. |
| 5,223,806 | A | 6/1993 | Curtis et al. |
| 5,251,208 | A | 10/1993 | Canniff et al. |
| 5,274,783 | A | 12/1993 | House et al. |
| 5,367,678 | A | 11/1994 | Lee et al. |
| 5,437,060 | A | 7/1995 | Delamater et al. |
| 5,445,128 | A | 8/1995 | Letang et al. |
| 5,615,404 | A | 3/1997 | Knoll et al. |
| 5,623,610 | A | 4/1997 | Knoll et al. |
| 5,694,555 | A | 12/1997 | Morriss et al. |
| 5,737,356 | A | 4/1998 | Harrison et al. |
| 5,742,847 | A | 4/1998 | Knoll et al. |
| 5,801,602 | A | 9/1998 | Fawal et al. |
| 5,815,516 | A | 9/1998 | Aaker et al. |
| 5,909,556 | A | 6/1999 | Morriss et al. |
| 5,939,997 | A * | 8/1999 | Sekine et al. .............. 340/3.43 |
| 5,946,215 | A | 8/1999 | Mito |
| 5,978,875 | A | 11/1999 | Asano et al. |
| 5,995,512 | A * | 11/1999 | Pogue, Jr. .................. 370/419 |
| 6,013,108 | A | 1/2000 | Karolys et al. |
| 6,115,713 | A | 9/2000 | Pascucci et al. |
| 6,195,724 | B1 | 2/2001 | Stracovsky et al. |
| 6,273,771 | B1 | 8/2001 | Buckley et al. |
| 6,311,296 | B1 * | 10/2001 | Congdon ..................... 714/56 |
| 6,339,298 | B1 * | 1/2002 | Chen .......................... 315/224 |
| 6,426,570 | B1 * | 7/2002 | Nerone ...................... 307/10.8 |
| 6,452,938 | B1 | 9/2002 | Fawal et al. |
| 6,550,018 | B1 * | 4/2003 | Abonamah et al. ............. 714/6 |
| 6,600,972 | B2 | 7/2003 | Morrison et al. |
| 6,934,137 | B2 * | 8/2005 | Elliott et al. .................. 361/62 |

FOREIGN PATENT DOCUMENTS

| | | |
|---|---|---|
| EP | 0 449 458 A1 | 10/1991 |
| WO | WO 99/63409 | 12/1999 |

OTHER PUBLICATIONS

Tobias Wenzel; Infineon; *CAN Baudrate Detection with Infineon CAN Devices*; Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366.

PCT Notification of Transmittal of the International Search Report, PCT International Search Report for PCT/US02/13367 (Filed Apr. 26, 2002).

PCT Communication Relating to the Results of the Partial International Search for PCT/US/01/47393.

Temple, C., "*Avoiding the babbling-idiot failure in a time-triggered communication system*", Fault-Tolerant Computing, 1998. Digest of Papers. Twenty-eighth annual International Symposium on Munich, Germany, Jun. 23-25, 1998, Los Alamitos, CA, USA, IEEE Comput. Soc., US, Jun. 23, 1998, pp. 218-227, XP010291298, ISBN: 0-8186-8470-4.

\* cited by examiner

SYSTEM AND METHOD FOR MAINTAINING PROPER TERMINATION AND ERROR-FREE COMMUNICATION IN A NETWORK BUS

FIELD OF THE INVENTION

The present invention relates generally to systems and methods for reliably communicating over a network bus and, more particularly, to systems and methods for maintaining the proper termination and error-free communication in a network bus in the event of various types of bus failures including a short circuit condition, an open circuit condition or a network device that improperly occupies the network bus with meaningless data.

BACKGROUND OF THE INVENTION

As systems, such as multimedia entertainment, communications, process control systems and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required can quickly become excessively large, both in terms of the space required for the wiring and the cost of the wiring and the attendant installation. Moreover, as the amount of dedicated wiring increased, the overall complexity of the system also generally increased as well as the likelihood that some portion of the wiring might be damaged or broken during or following installation.

As such, network busses have been developed to provide a common communication path between a plurality of devices. In automotive and aerospace applications, for example, a network bus can be utilized to monitor various components and to collect diagnostic and status information. In this regard, diagnostic and status information relating to the strain, acceleration, pressure and/or temperature to which the various components are subjected may be collected and analyzed. By way of further example, a network bus architecture is currently being developed to support process control applications, as wells communications and the delivery of multimedia information to the occupants of a vehicle, such as an automobile, minivan, sports utility vehicle, aircraft, boat or the like. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. Also, the network bus may transmit video signals, including streaming video signals, from a television receiver, a videocassette recorder or other video source to one or more video monitors. In addition, the network bus may transmit sensor and actuator signals to and from devices such as drivetrain devices, passive restraint devices, crash avoidance devices, drive-by-wire devices, or the like.

In addition to the variety of devices that are connected to a network bus, one or more controllers are also generally connected to the network bus for receiving data from the various devices and for sending commands to the devices. Among other things, these commands specify the manner in which the various devices are to function including the manner in which the various devices are to transmit information over the network bus. Additionally, the controller(s) can receive input from an operator, such as an occupant of the vehicle. This input can include, for example, an indication of the source(s) of the signals to be transmitted over the network bus as well as the destination of the signals.

Traditionally, networks of the type described above have transmitted data in analog format. Unfortunately, analog signals are susceptible to noise introduced into the signals during data transmission. Given that many of the transmitted signals have a low amplitude to start with, this noise can corrupt the signal and decrease the signal to noise ratio to levels that cause loss of resolution in the signal. Further, as many of these network devices are scattered some distance from the controller, the electrical lines connecting the network devices to the controller may be sufficiently long to cause signal degradation due to DC resistance in the wiring.

In light of these shortcomings, it would be advantageous to utilize digital networks. But, many conventional digital networks suffer from a variety of problems themselves. For example, many existing digital networks operate according to complicated protocols which require each network device to have a relatively high level processor, thereby increasing the cost of the network devices. Complicated protocols also introduce overhead into the messages on the bus that are not necessary for data acquisition and control. This overhead can severely limit the number of data samples that can be transmitted on the bus. These networks also have other problems. For example, they generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner. As such, these computer systems generally lack the capability to schedule a trigger command to the network components that repeats or is interpreted and executed with any precision timing.

Regardless of the digital or analog nature of network, the network bus may be damaged during or following installation. In this regard, the network bus typically consists of a plurality of conductors or wires that may extend great lengths between the various controllers and network devices. Due to accidents or other unforeseen circumstances, one or more of the wires may be broken, thereby creating an open circuit. Thus, components on one side of the open circuit will be unable to communicate via the broken conductor with components on the other side of the open circuit. Additionally, signals transmitted over the broken conductor will be reflected by the broken end of the conductor due to the characteristic impedance mismatch. The reflected signals will then be returned along the conductor, thereby interfering, both constructively and destructively, with other signals being transmitted via the conductor. While the components on one side of the open circuit may be able to communicate at relatively low data rates, such as ten kilobits per second, reflected signals will generally prevent effective communications between the components at higher data rates such as ten megabits per second or the like. The destructive interference caused by the reflected signals caused by the open circuit will render the signals on the broken conductor more susceptible to noise, thereby further limiting effective communications.

In instances in which one or more conductors of the network bus are broken, one of two different approaches has generally been taken. According to one approach, the network bus remains unrepaired for at least some period of time and communications continue over the network bus, albeit at a relatively slow data transfer rate that is selected so as not to be corrupted by the reflected signals. Since a number of applications require that communications be conducted via the network bus at relatively high data transfer rates, the intentional slowing of the data over the network bus to reduce, if not negate, the deleterious impact of reflected signals may be inappropriate. Alternatively, communications via the network bus can be halted and a technician or repair person can troubleshoot the network bus to identify the break in the network bus and can then physically repair the broken conductors. Once the repairs have been completed, the communications over the network bus can be recommenced. However, the physical repair of the network bus oftentimes requires that the network bus be removed from service for some period of time, which action may also be inappropriate for certain applications, such as time-sensitive applications or other applications that demand continuous monitoring or feedback.

A network bus may have other types of failures in addition to failures attributable to an open circuit. For example, one or more of the pairs of conductors that comprise the network bus may develop a short circuit. In this instance, the network controller and the network devices will no longer be able to communicate via the pairs of conductors that are shorted. As such, the network bus would have to be removed from service, the location of the short circuit would have to be identified, and the network bus could be repaired, prior to recommencing communications via the network bus.

In addition to short circuit and open circuit conditions on the network bus, a network device that is electrically connected to the network bus may fail and, as a result, may create problems for the network bus and for other network devices connected to the network bus. In this regard, some failure modes of the network devices are self-limiting in that failure of a network device does not adversely impact continued communications of the other network devices over the network bus. However, other failure modes of the network devices may create problems on the network bus and effectively prevent other network devices from communicating via the network bus. One example of a failure mode of a network device that creates problems on the network bus is exhibited in instances in which a network device that fails emits a stream of meaningless data onto the network bus. In this situation, the network device is typically described to be "babbling."

A network device that is babbling can monopolize control of the network bus and can prevent the network controller and the other network devices from communicating via the network bus. In this situation, the network device that is babbling must be identified and removed from the network bus in order to permit the other network devices and the network controller to communicate via the network bus. As will be apparent, the process of identifying the network device that is babbling and thereafter removing the babbling network device from the network bus can be time-consuming, during which time the network bus will be unavailable for communications between the other network devices and the network controller.

Yet another type of failure of a network device that could cause the whole network to fail is that of a short circuit condition inside the network device that causes it to draw too much current. If the network device draws more than the amount of current that can properly be supplied by the power supply in the network controller and power conductors of the network bus, the power voltage supplied to the other network devices will drop to levels that will cause them to be inoperable. As will be apparent, the process of identifying the network device that is shorted and thereafter removing the shorted network device from the network bus can be time-consuming, during which time the network bus will be unavailable for communications between the other network devices and the network controller.

As described above in conjunction with the repair of a network bus having an open circuit condition, the removal of a network bus from service in order to repair a short circuit condition or to remove a network device that is babbling from the network bus will require that the network bus be out of service for some period of time and would therefore be inappropriate for certain applications including time-sensitive applications or other applications that demand continuous monitoring or feedback.

Accordingly, it would be advantageous to develop an improved network bus that could accommodate bus failures caused by open and short circuit conditions and by network devices that begin babbling. Moreover, it would be desirable for the improved network bus to support continued communications between the devices connected to the network bus without having to slow the data transfer rate and without having to remove the network bus from service in order to physically repair the network bus.

SUMMARY OF THE INVENTION

A system and method for maintaining the proper termination of a network bus are therefore provided. According to the present invention, the system and method can identify bus failure due to open or short circuit conditions or due to a network device that is babbling or shorted and can automatically reconfigure the network bus to continue to support communications without slowing the data transfer rate and without having to remove the network bus from service for any extended period of time in order to physically repair the network bus. As such, the system and method of the present invention support continued high speed data communications over the network bus even in the event of a bus failure due to an open or short circuit condition or due to a network device that is babbling.

According to one aspect of the present invention, at least one network device electrically connected to and adapted to communicate via the network bus. The network devices are capable of transmitting signals to, and receiving signals from, the network bus where the network bus includes a power bus. The system also includes a network controller that is electrically connected to the network bus and is adapted to direct communications with the network devices via the network bus. The network controller is also adapted to provide power signals to the network devices via the power bus of the network bus.

To protect signals on the network bus, including the power bus, the system includes at least one bus protection element disposed between respective network devices and the network bus. The network controller and/or the bus protection elements can monitor signals on the network bus, such as signals transmitted and received by the network devices to thereby identify improper signals. And based upon the network controller and/or bus protection elements identifying a predefined number of improper signals, the bus protection elements can selectively connect and disconnect respective network devices to and from the network. For example, the bus protection elements can monitor the signals transmitted and received by the respective network device to identify improper signals. If a predefined number of improper signals are identified, the bus protection element can then controllably halt the transmission of signals from the respective network device to the network bus Each bus protection element can include a communications interface having a transmitter for transmitting signals from the network device to the network bus, and a receiver for receiving signals on behalf of the network device from the network bus. To control the transmission of signals from the network device to the network bus, the bus protection element includes at least one isolation switch capable of being disposed in on and off modes and positioned between the communications interface and the network bus. Additionally, the bus protection element includes a logic element electrically connected to the isolation switches and the communications interface. The logic element is capable of monitoring the signals transmitted by the transmitter and identifying improper signals. If a predefined number of improper signals are identified, the logic element can controllably operate the isolation switches to thereby halt the signals transmitted by the network device, such as by placing the isolation switches in the off mode.

The bus protection element can further include a diagnostic switch to allow the bus protection element to perform a diagnostic check if the predefined number of improper signals are identified. The diagnostic switch is disposed between the transmitter and the network device, and can controllably halt the transmission of signals from the network device to the transmitter. In this regard, the logic element can controllably operating the diagnostic switch if the predefined number of improper transmitted signals are identified. Also, the transmitter and receiver can be electrically connected so that after the logic element halts the transmission of signals from the network device to the transmitter and the transmission of signals from the transmitter to the network bus, the logic element can transmit diagnostic signals through the transmitter and receive corresponding return signals from the receiver. Knowing the diagnostic signals and receiving the return signals, the logic element can then compare the diagnostic signals and the return signals and, if substantially identical, the logic element will determine that the network device is actually functioning properly and can be reconnected to the network bus. Thus, the logic element can controllably operate the isolation and diagnostic switches to permit the transmission of signals from the network device to the bus via the transmitter, such as by operating the isolation and diagnostic switches in the on mode.

According to another aspect of the present invention, each bus protection element includes a first set of switches in-line with the network bus that is closed upon the application of power to the power bus. By closing the first set of switches, the network device associated with the bus protection element can be connected to the network bus. Each bus protection element also includes a second set of switches in-line with the network bus that are closed following the application of power to the power bus and in further response to a command from the network controller. By closing the second set of switches, the network controller can communicate, not only with the network device associated with the respective bus protection element, but also with other network devices connected to the network bus, downstream of the bus protection element. In addition, each bus protection element includes a termination element adapted to be switchably connected to the network bus upon the application of power to the power bus and to be switchably disconnected from the network bus in response to a command from the network controller. By connecting the termination element to the network bus while the first set of switches is closed, but before the second set of switches is closed, the integrity of a portion of network bus can be maintained. By disconnecting the termination element upon receipt of the command from the network controller, and closing the switches to the next segment of the network bus, the network controller is permitted to communicate with other network devices downstream of the bus protection element. Typically, the same command issued by the network controller causes the termination element to be disconnected and the second set of switches to be closed. The process of connecting the network devices to the network then preferably continues, one at a time, until all of the network devices are connected to the network bus.

In order to detect the power applied via the power bus, each bus protection element of this aspect of the present invention can include a first power detector for detecting the application of power to the power bus. If power is detected, the first power detector can signal the first set of switches to close and can cause the termination element to be connected to the network bus. Each bus protection element can also include a power switch in-line with the power bus and adapted to be closed in response to the command issued by the network controller so as to supply power to the other network devices downstream of the bus protection element. Preferably, each bus protection element of this aspect of the present invention includes a second power detector that includes the power switch for detecting the application of power to the power bus and, if power is applied to the power bus, for signaling the second set of switches to close. By including the second power detector, the bus protection element can be symmetrical such that power and communications signals can be provided to the bus protection element from either direction.

The termination element is preferably switchably connected to the network bus between the first and second sets of switches in order to properly terminate the network bus while the first set of switches is closed and prior to closing the second set of switches. In this regard, each bus protection element preferably includes the same number of termination elements as the number of communication pairs of conductors at the network bus. Each termination element is therefore adapted to be switchably connected across a respective pair of conductors. In addition, each termination element advantageously includes a resistor having a resistance that matches the characteristic impedance of the network bus in order to properly terminate the network bus.

In one embodiment of this aspect of the present invention, the system includes first and second network controllers, connected to opposite ends of the network bus. Thus, in the event of a bus failure, each network controller can continue to communicate with a respective portion of the network bus even though the network bus is no longer contiguous.

In one embodiment, each network device is associated with a network device interface. The network device interface is connected to the network bus and is separately connected to the network device via a data channel. In this embodiment, the network device interface can include the bus protection element.

A network protection element and method for maintaining proper termination and error-free communication conducted via a network bus that is electrically connected to at least one network device are also provided. Thus, the present invention provides a system, network protection element and method that permit a bus failure to be identified and the network bus to be automatically reconfigured such that the functionality of the network bus will be maintained. As such, communications can continue over the network bus at a high data transfer rate without concern for undesirable reflections or other noise caused by a bus failure such as an open or short circuit or the connection of a babbling or shorted network device. Moreover, the system and method of the present invention permit continued communications over the network bus without having to remove the network bus from service in order to physically repair the network bus. Thus, communications can continue and the network bus can be scheduled for repair at some more convenient time, such as during some period of time in which the network bus would otherwise have been idle.

BRIEF DESCRIPTION OF THE DRAWINGS

Figure 1:
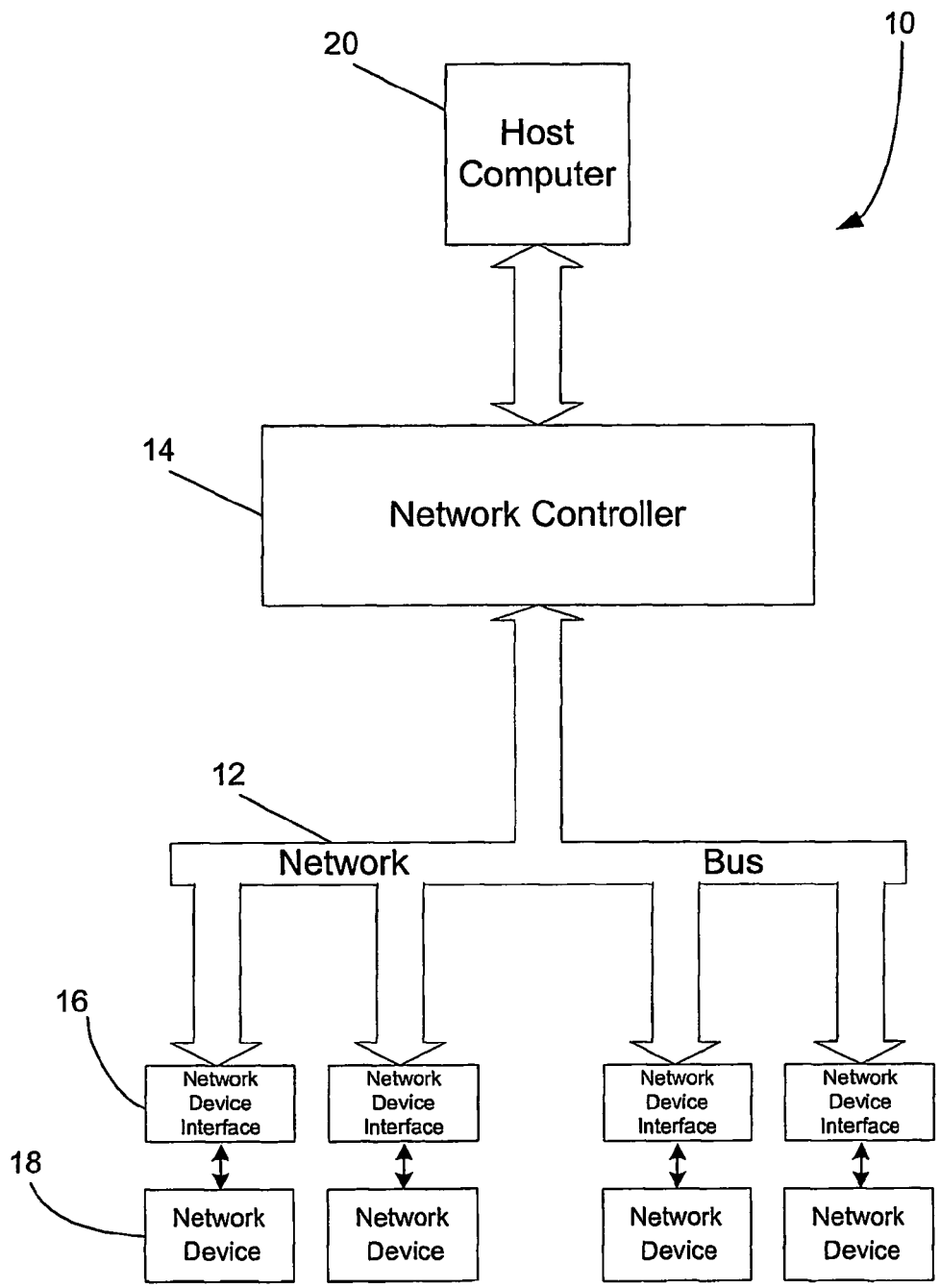
Figure 2A:
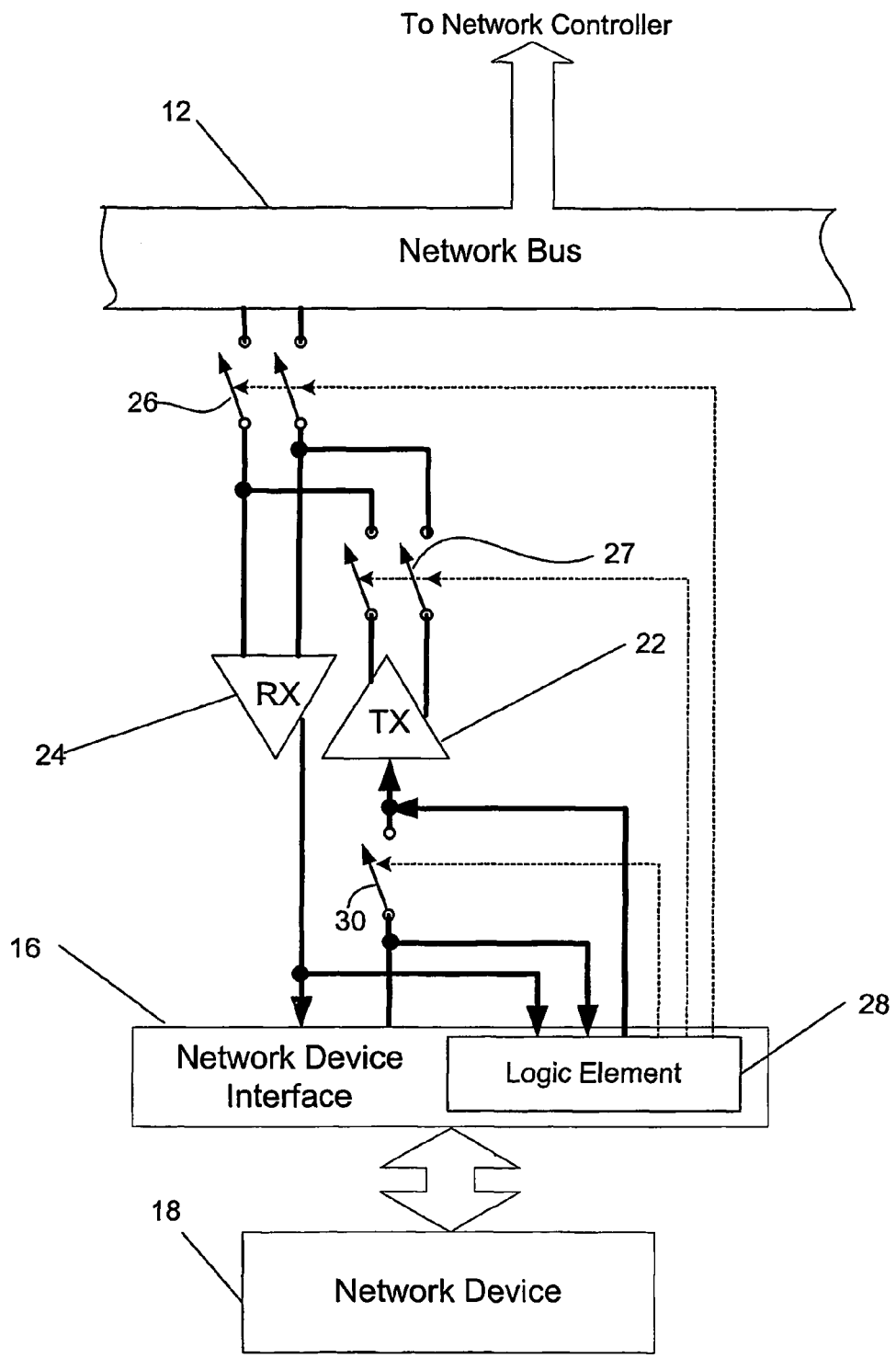
Figure 2B:
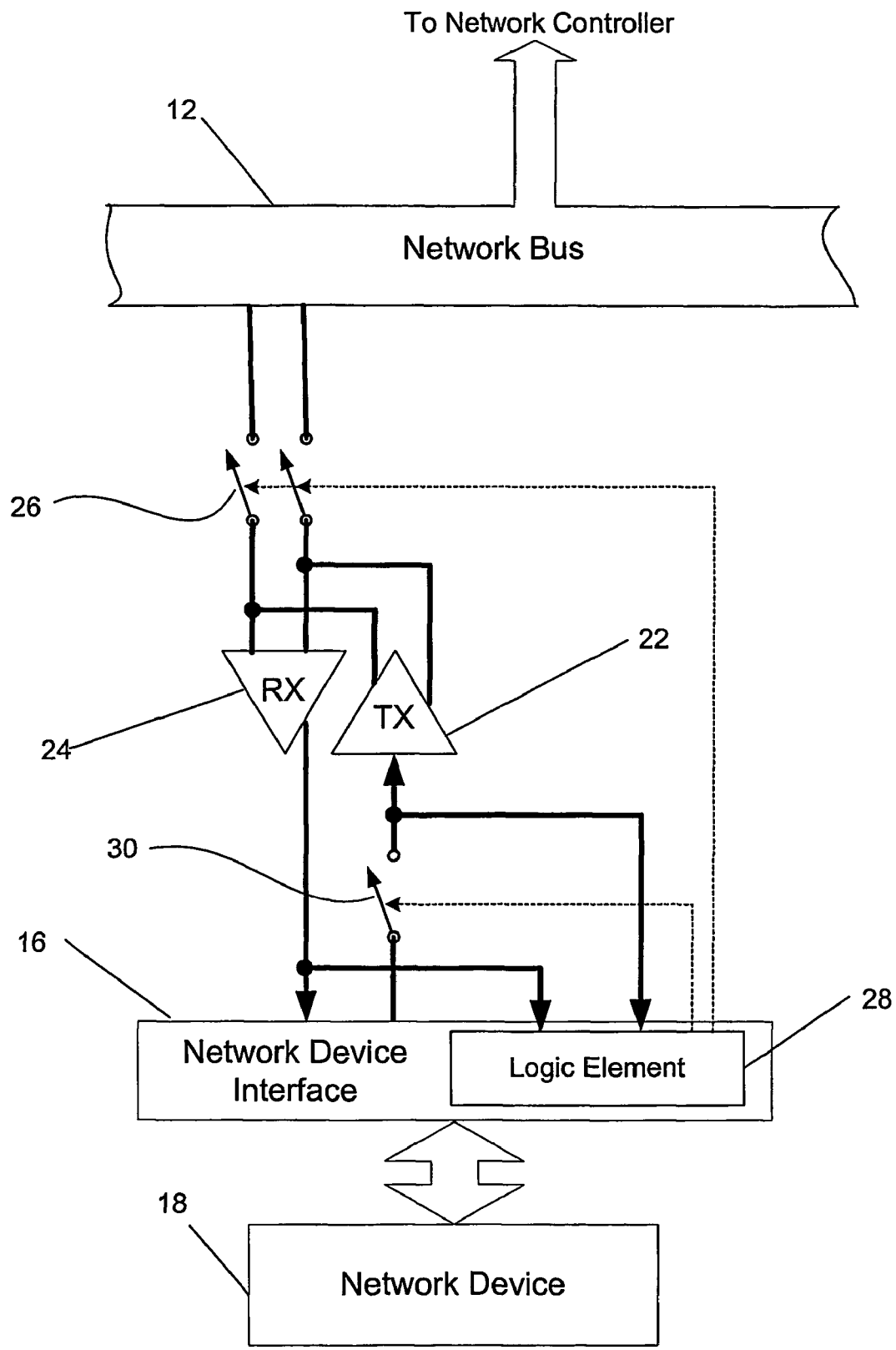
Figure 3A:
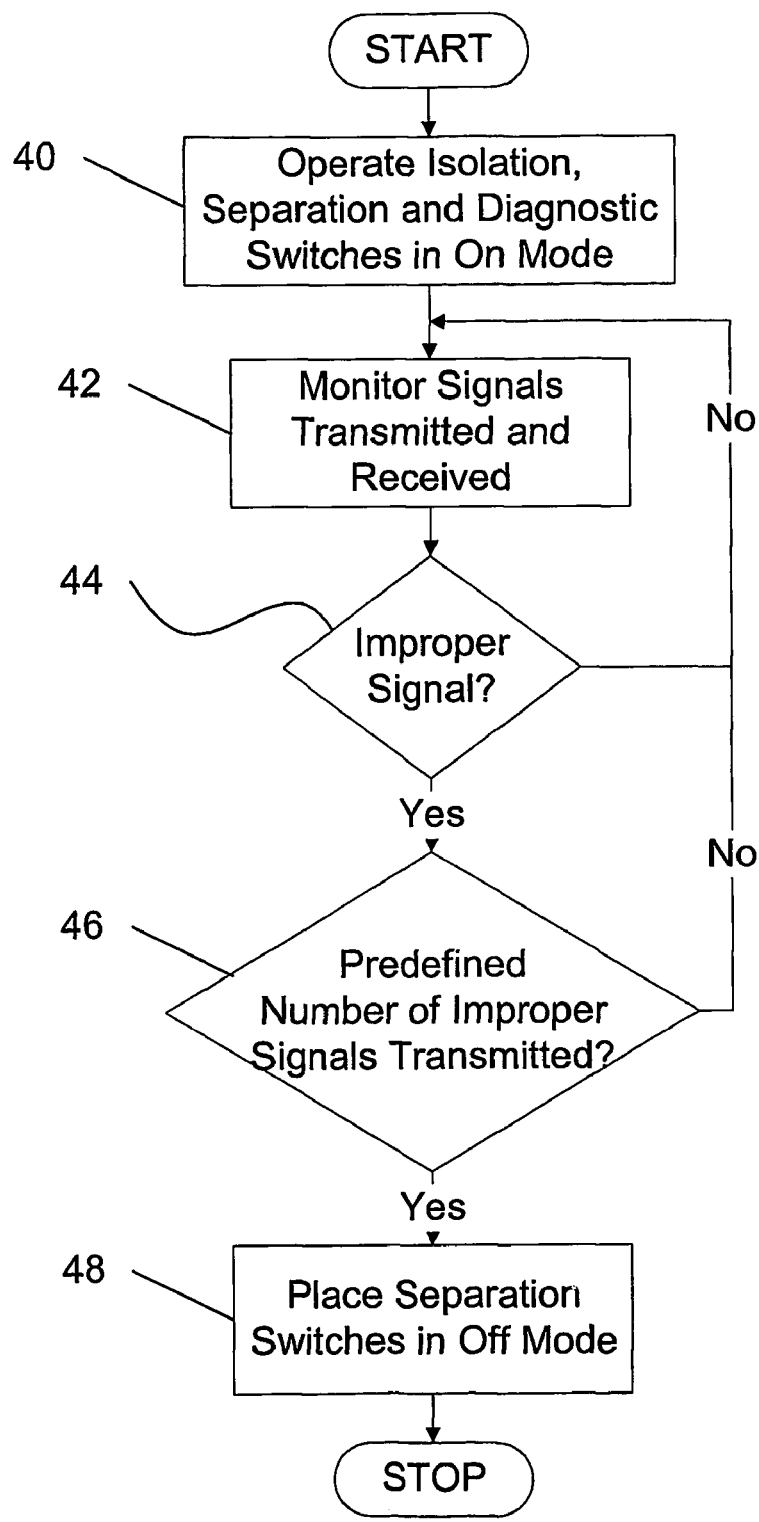
Figure 3B:
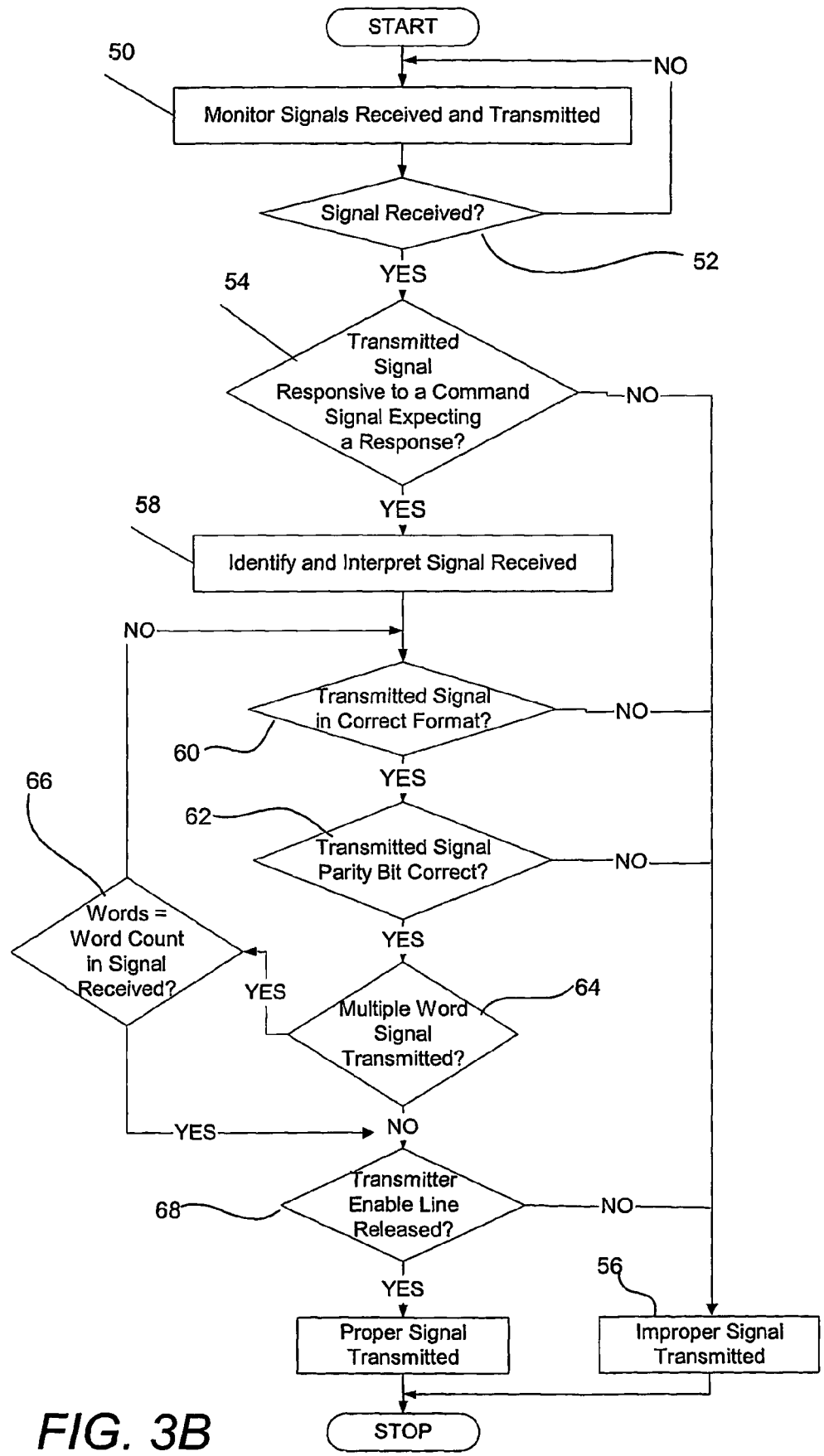
Figure 3C:
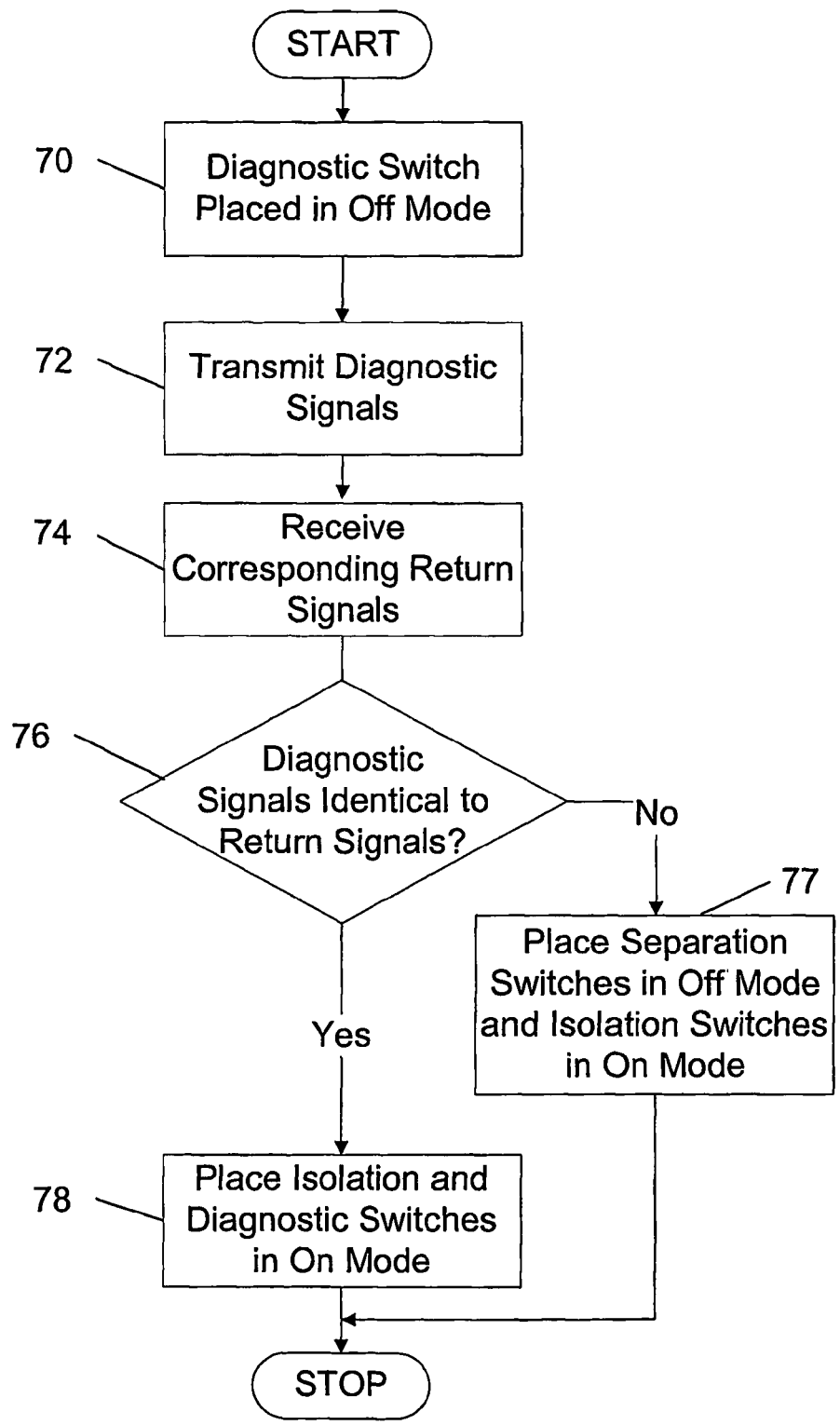
Figure 4A:
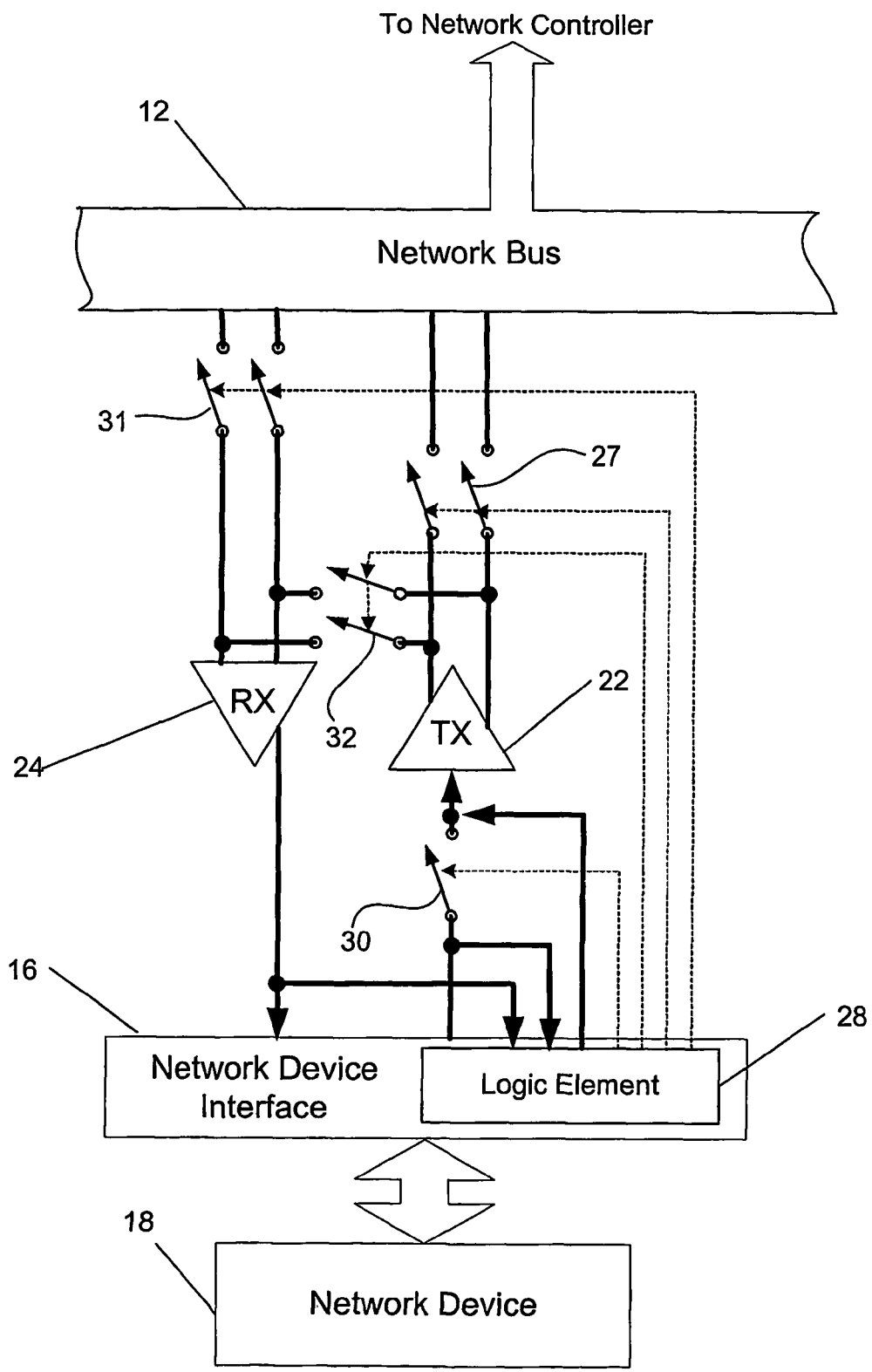
Figure 4B:
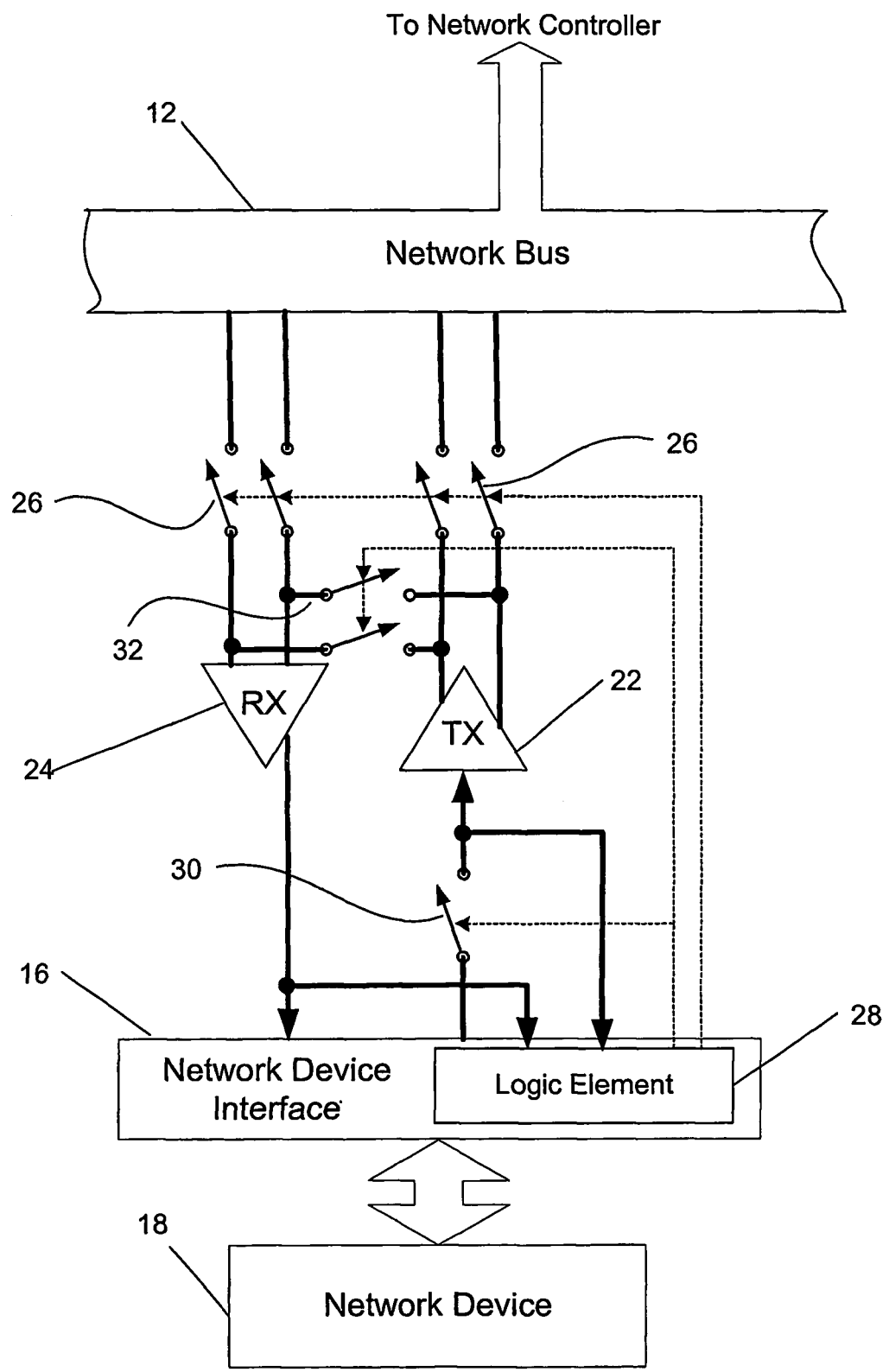
Figure 5:
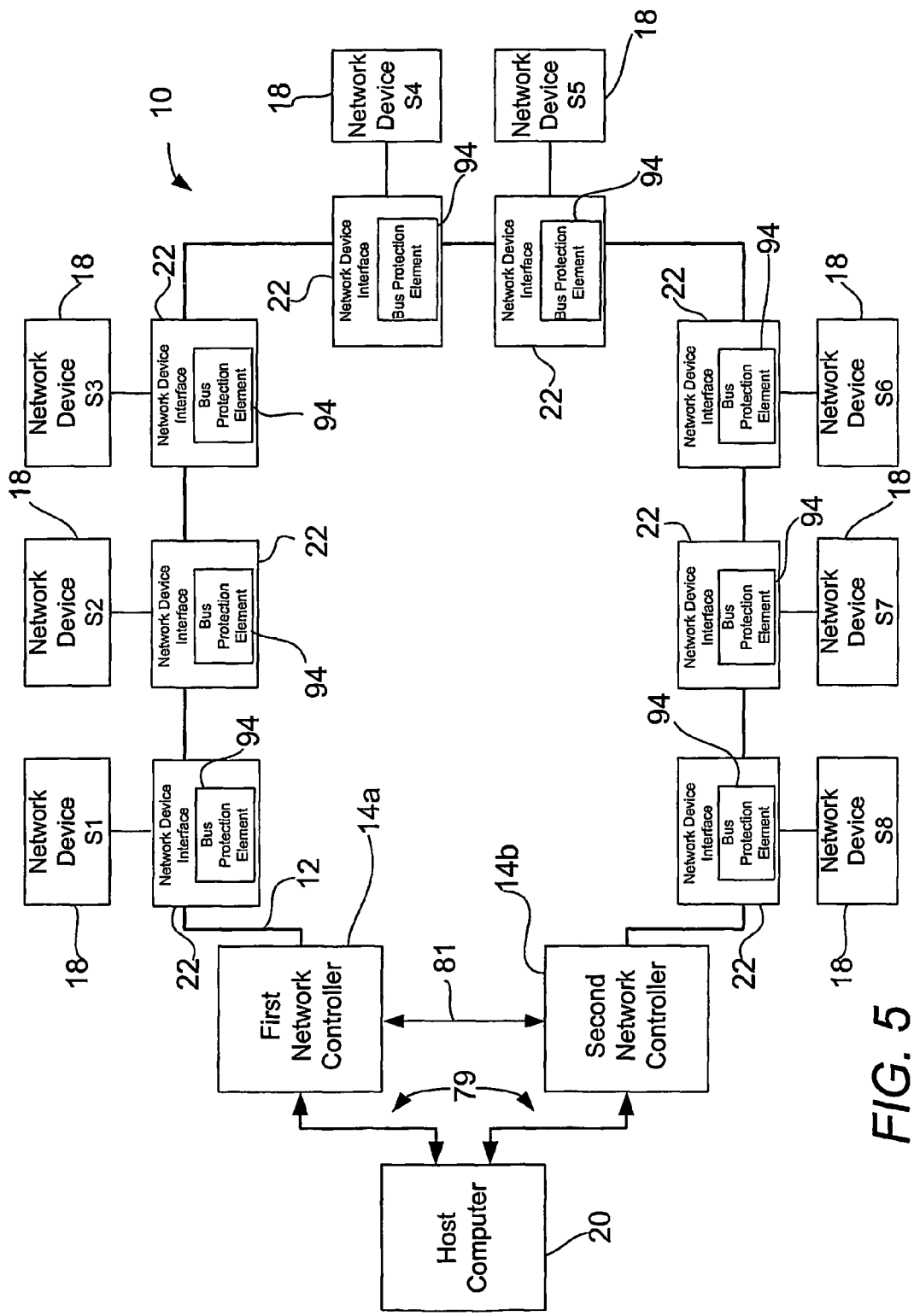
Figure 6:
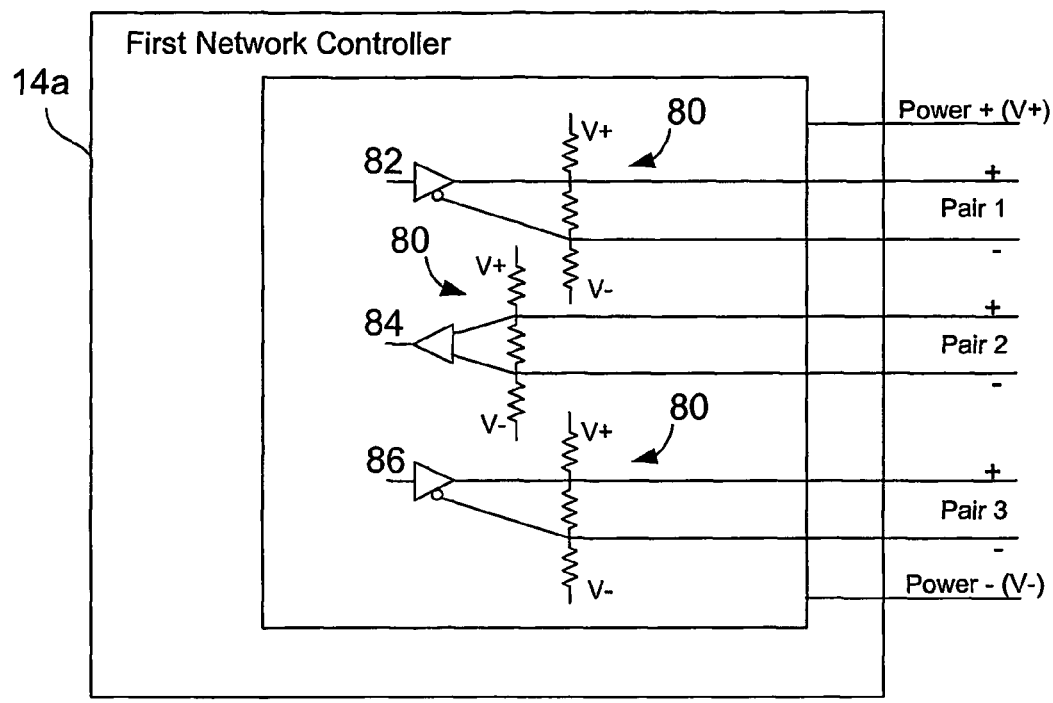
Figure 6:
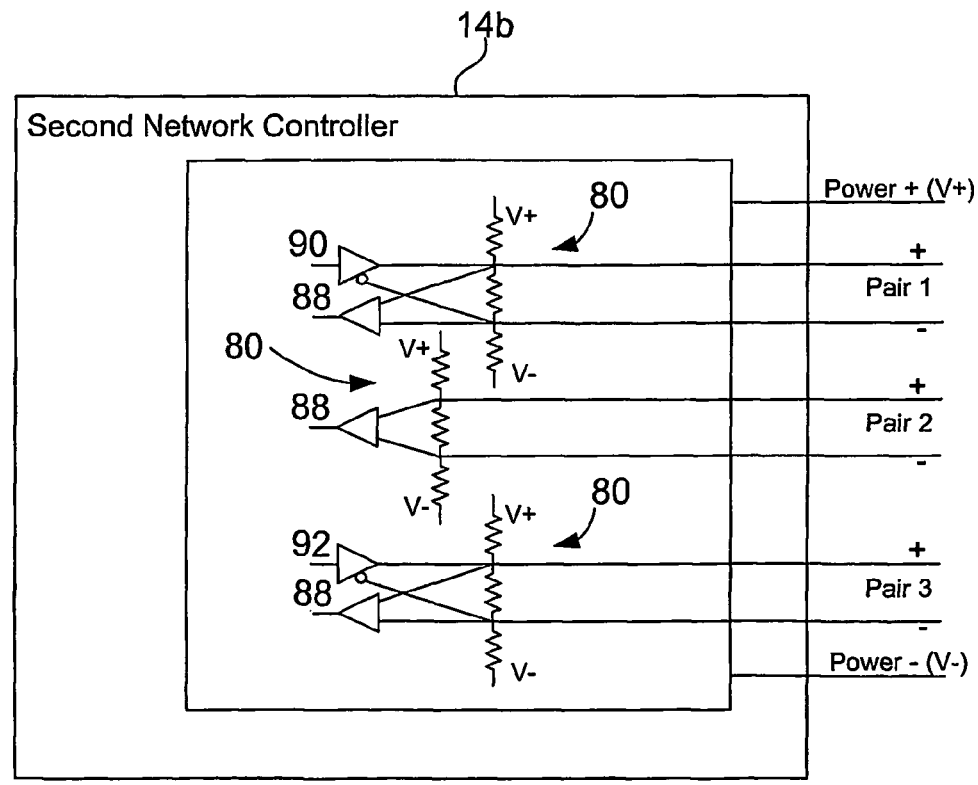
Figure 7:
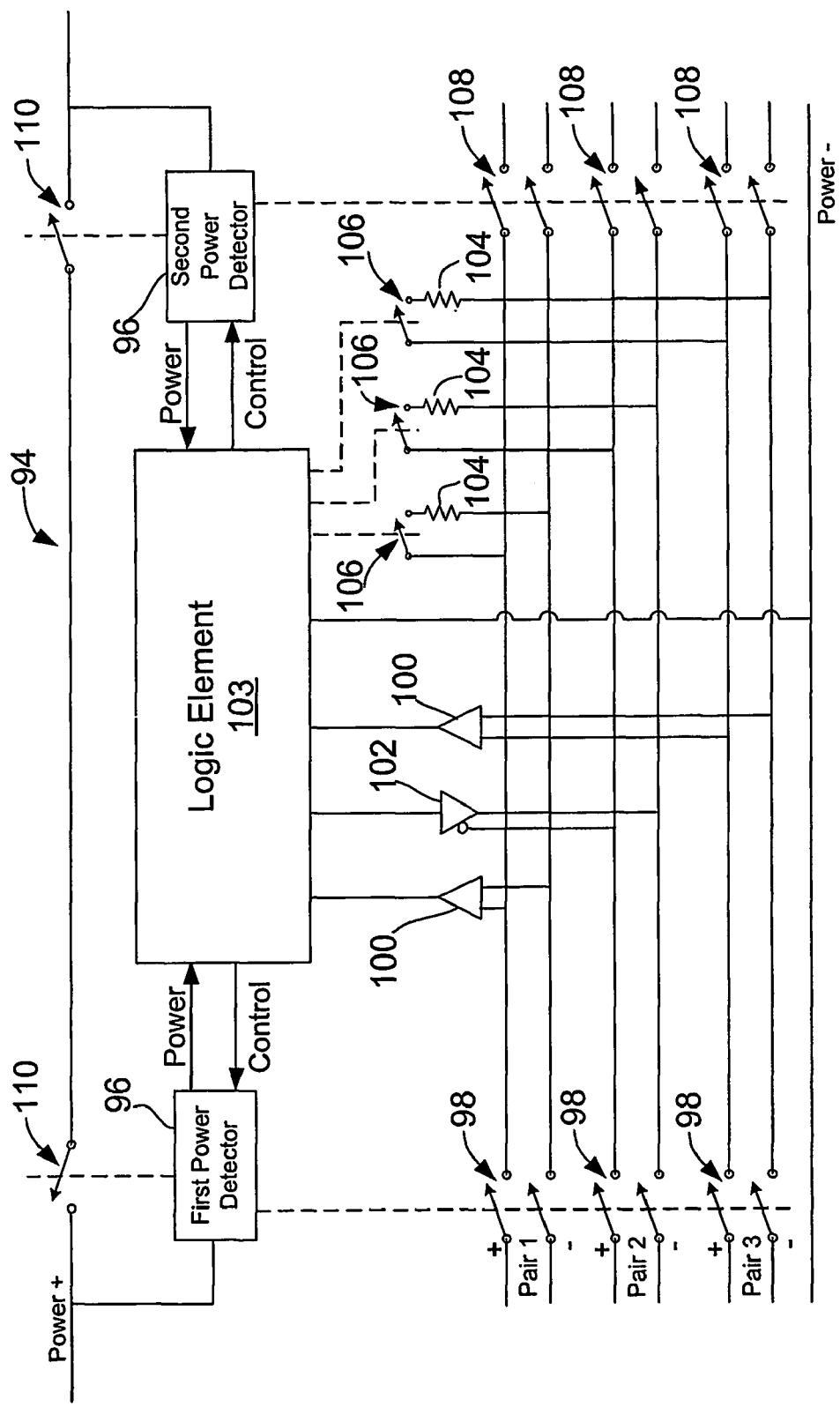
Figure 8A:
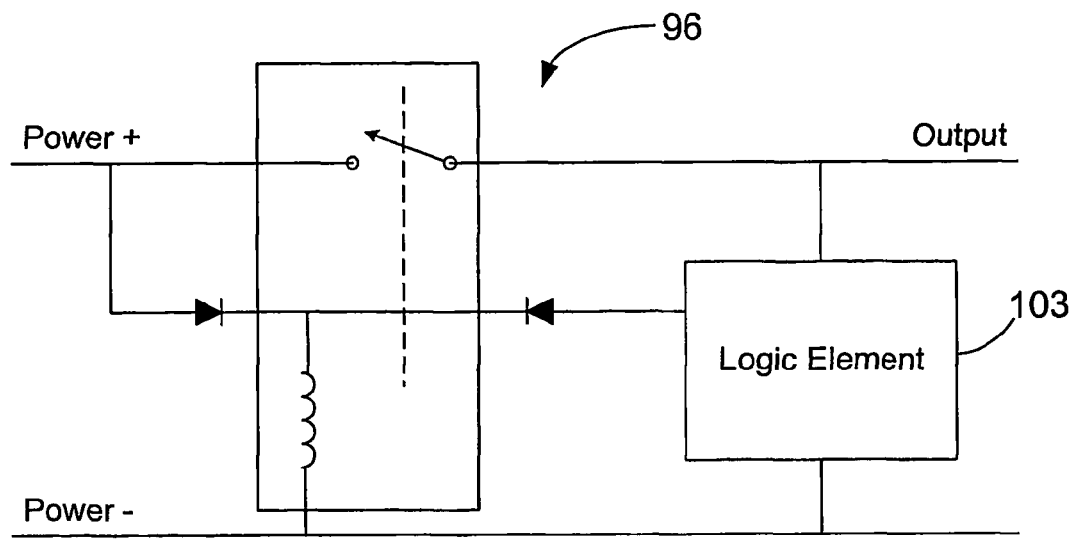
Figure 8B:
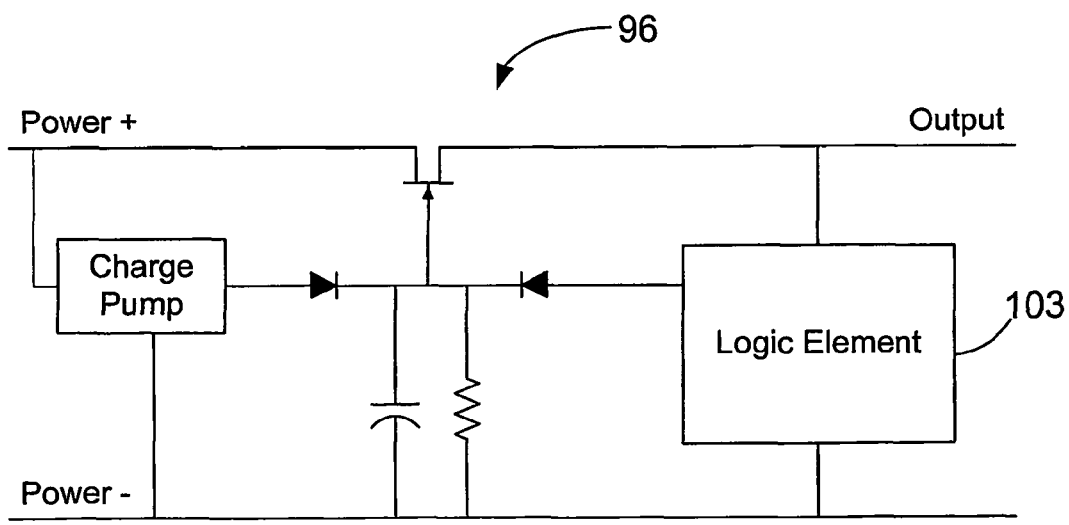
Figure 9:
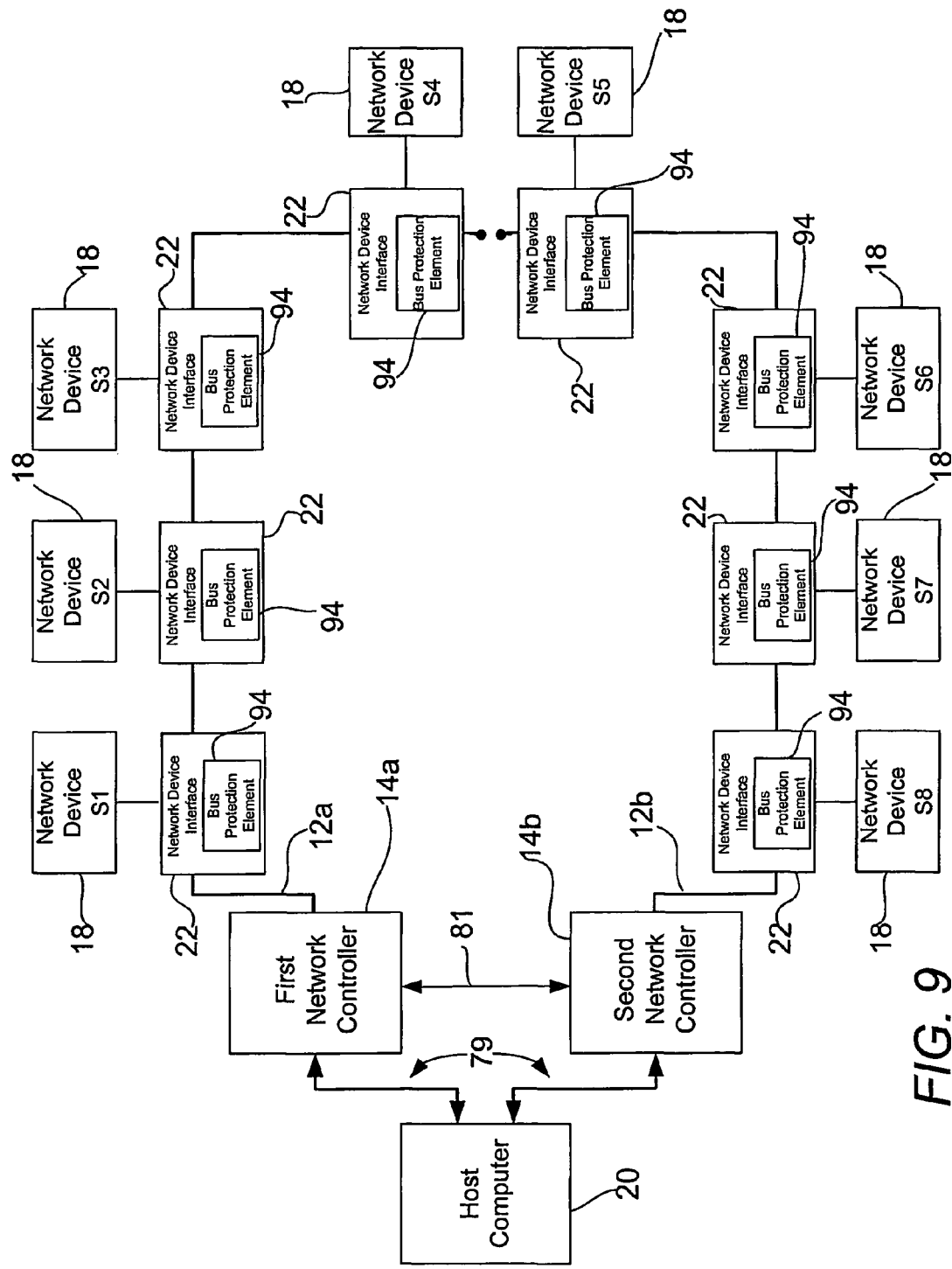

Having thus described the invention in general terms, reference will now be made to the accompanying drawings, which are not necessarily drawn to scale, and wherein:

FIG. 1 is a schematic block diagram illustrating a network system that would benefit from the network bus protection afforded by one embodiment of the present invention;

FIG. 2A is an exploded schematic block diagram illustrating various elements of the bus protection system, according to one embodiment of the present invention;

FIG. 2B is an exploded schematic block diagram illustrating various elements of the bus protection system, according to another embodiment of the present invention;

FIG. 3A is a flow chart illustrating the method of protecting communications conducted via a network bus, according to one embodiment of the present invention;

FIG. 3B is a flow chart illustrating the steps in identifying improper signals according to one embodiment of the present invention;

FIG. 3C is a flow chart illustrating diagnostic steps of the method of protecting communications via a network bus, according to one embodiment of the present invention;

FIG. 4A is an exploded schematic block diagram illustrating various elements of the bus protection element of another embodiment operating with a network having separate pairs of conductors for the transmitter and receiver;

FIG. 4B is an exploded schematic block diagram illustrating various elements of the bus protection element of yet another embodiment operating with a network having separate pairs of conductors for the transmitter and receiver;

FIG. 5 is a schematic representation of a system according to yet another embodiment of the present invention that includes a pair of network controllers connected to opposite ends of a network bus;

FIG. 6 is a schematic representation of the transmission and reception portions of the first and second network controllers according to one embodiment of the present invention;

FIG. 7 is a schematic representation of a bus protection element according to one embodiment of the present invention;

FIGS. 8A and 8B are schematic representations of two embodiments of a power detector of a bus protection element according to the present invention; and FIG. 9 is a schematic representation of the system of FIG. 5 following a bus failure.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a system 10 that would benefit from the protection afforded by the present invention is depicted. While several embodiments of the system are illustrated and will be hereinafter described for purposes of example, other types of systems can readily employ the protection afforded by the present invention. Moreover, the system and method of the present invention will be primarily described in conjunction with automotive and aerospace applications, such as automotive and aerospace applications designed to support communications and the delivery of multimedia information to the occupants of a vehicle and/or to monitor various components, to collect diagnostic and status information and provide process control information to sensors and actuators. However, the system and method of the present invention can be utilized in conjunction with a variety of other applications, both in the automotive and aerospace industries and outside of those industries.

As shown in FIG. 1, the system 10 includes a network bus 12 electrically connected to a network controller 14. Whereas, the system illustrated only includes a single network controller, it should be understood that more than one network controller can be utilized, such as for fault tolerance purposes, without departing from the spirit and scope of the present invention. The system depicted in FIG. 1 also includes a plurality of network devices 18 electrically connected to the network bus and, in turn, to the network controller, at different points along the network bus. Thus, the network bus supports communications between the network controller and the network devices, as well as communications between the network devices themselves.

The network controller 14 is designed to issue commands to respective network devices 18 and, in at least some instances, to receive data from the network devices. For example, the commands may dictate that a network device provide a particular type of data, such as status or other diagnostic data. Alternatively, the commands issued by the network controller can direct one or more of the network devices to provide signals of a predetermined type, such as audio signals, video signals or the like, and for one or more of the other network devices to receive the signals. Although various types of network controllers can be utilized, one advantageous type of network controller is the network controller described by U.S. patent application Ser. No. 09/736,878 entitled Network Controller for Digitally Controlling Network Devices Via a Common Bus, filed Dec. 14, 2000, the contents of which are incorporated herein by reference. As described in U.S. patent application Ser. No. 09/736,878 and as illustrated in FIG. 1, the network controller may also be disposed in electrical communication with a host computer 20 that generally directs the operation of the network controller and that analyzes data received by the network controller from the network devices.

Various types of network buses 12 can be employed. Typically, the network bus consists of one, two, three or more pairs of wires, such as differential twisted pair copper wires, for transmitting commands, data and other signals. As such, the network bus can be designed to support either a standard half duplex configuration or a full duplex configuration. In some embodiments desiring synchronous communications, one of the pair of wires can be utilized to transmit a clock signal typically from a network controller to the network devices 18. Still further, the network bus can include a pair of power lines, such as power wires, for supplying power and a common ground to the remote devices.

The network devices 18 include, and are associated with, respective remote devices that can include a wide variety of devices; most, if not all, of which are located remote from the network controller 14. For example, the remote devices can include sensors for providing data, such as status or diagnostic data, to the network controller so that the health and/or operation of whatever the sensor is sensing can be monitored. In an automotive application, for example, the remote devices can include sensors for monitoring the throttle position, the oil pressure, the water temperature, the transmission fluid pressure, the seat position, the antilock brake system, the suspension, the passive restraint system and the steering system, to name but a few. Alternatively, the remote devices may include an actuator for performing a particular function in response to a command from the network controller. In the automotive application, for example, the remote devices can include actuators for controlling the throttle position, the anti-lock brake system, the suspension, the passive restraint system and the active suspension system, to name but a few. Still further, the remote devices may include an audio or video source. In this regard, the remote devices can include radio receivers, tape cassette players, compact disc players, and cellular telephone receivers for providing audio signals, including in some instances streaming audio signals, to the network bus. Correspondingly, the remote devices can include speakers, headphone jacks or the like for receiving audio signals from the network bus and for providing a corresponding audible output. Similarly, the remote devices can include a television receiver or a video cassette player providing video signals to the network bus. Accordingly, the remote devices can include a video monitor or the like for receiving the video signals and for displaying images based upon the video signals.

While the remote devices 19 of the respective network devices 18 may be directly connected to the network bus 12, the network devices 18 of one advantageous embodiment include respective network device interfaces 16 as described by U.S. patent application Ser. No. 09/735,146 entitled Network Device Interface for Digitally Interfacing Data Channels to a Controller Via a Network, filed Dec. 12, 2000, the contents of which are incorporated herein in their entirety. In this advantageous embodiment, the network device interface is disposed in electrical communication with the network bus for transmitting signals to the network bus and for receiving signals from the network bus. Each network device interface is also in communication with one or more remote devices via respective data channels. While each network device interface is shown to be connected to a single remote device in FIG. 1, the network device interface could be connected to two or more remote devices, if so desired.

As described by U.S. patent application Ser. No. 09/735, 146, the network device interface 16 performs various functions to facilitate communications by the remote device 19 over the network bus 12. For example, the network device interface may store the data collected by the associated remote device(s) such that the stored data may be provided to the network controller 14 via the network bus upon request. If the remote device is an analog device, the network device interface may also convert signals between the digital format supported by the network bus and the analog format supported by the remote device. For purposes of explanation and not of limitation, however, the present invention will subsequently be described in terms of the network devices, which include respective remote devices and can additionally include associated network device interfaces.

Upon initialization of the network, the network controller 14 inventories the network devices 18 connected to the network bus 12 and assigns a unique logical address to each network device so that the network controller can communicate with a specific network device or a specific group of network devices. A wide variety of techniques can be utilized to inventory the network devices connected to the network bus and to assign unique logical addresses to the network devices. One advantageous technique for inventorying the network devices and assigning unique logical addresses is the bit competition technique described by U.S. patent application Ser. No. 09/736,878, U.S. patent application Ser. No. 09/735,146 as well as Provisional U.S. Patent Application No. 60/286,793 entitled Systems and Methods for Assigning an Address to a NetworkDevice Added to an Existing Network, filed Apr. 26, 2001, and PCT Patent Application No. PCT/US02/13366 entitled Systems and Methods for Assigning an Address to a Network Device Added to an Existing Network, filed Apr. 26, 2002, the contents of all of which are also incorporated herein in their entirety.

In operation, the network controller 14 issues various commands and respective network devices 18 respond based upon the commands. The network controller and the network devices can communicate according to any of a number of different protocols. As described in U.S. patent application Ser. No. 09/736,878, for example, the network controller and the network devices can communicate according to a Manchester-encoded bi-phase sensor and system (BiSenSys) protocol. Alternatively, the network controller and the network devices can communicate according to a protocol compatible with a universal asynchronous receiver transmitter (UART) physical layer. Preferably, however, the protocol is selected to minimize the overhead and to correspondingly maximize the data transfer capability. Further, the protocol is preferably selected to relatively simple such that neither the network devices nor the network device interfaces 18 will require a high level processor. Instead, the network controller and the associated host computer 20 can include the majority of the processing power and the network device interfaces can include logic that is readily implemented in hardware, software or firmware. The communications supported by the system 10 may also be either synchronous or asynchronous and may involve the transmission of various types of messages. As described by U.S. patent application Ser. No. 09/736,878, for example, one advantageous communications technique is based upon the transmission of message frames that include command frames and data frames having respective predetermined lengths or sizes. Depending upon the protocol, the system can also support various command sets. As with the protocol, the command set is preferably selected to minimize the overhead that must be transmitted via the network bus and to be relatively simple. One example of a suitable command set is described by U.S. patent application Ser. No. 09/735,146.

Regardless of the protocol implemented by the system 10, the network controller 14 can issue commands via the network bus 12 and thereafter await a response from the network devices 18. By way of example, the following table illustrates a command designated Trigger issued by the first network controller that polls specific network devices for data that has been collected by the network devices. The initial trigger command can poll the network devices designated S1, S2 and S5, while a subsequent trigger command polls the network devices designated S1, S3, S4, S6, S7 and S8 (shown in FIG. 5 in conjunction with an aspect of the present invention including two network controllers). As indicated, the network devices can be polled at different intervals, as demonstrated by the more frequent polling of the network device designated S1.

| First Network Controller | Second Network Controller |
| --- | --- |
| Trigger | |
| Poll S1 | |
| Poll S2 | |
| Poll S5 | |
| Trigger | |
| Poll S1 | |
| Poll S3 | |
| Poll S4 | |
| Poll S6 | |
| Poll S7 | |
| Poll S8 | |

As previously stated, it is anticipated that all network devices will fail at some point. To that end, referring now to FIG. 2A, the system 10 includes at least one bus protection element to protect the network bus 12 (and the system) from malfunctioning network devices (e.g., babbling idiots) that would otherwise result in a loss of the network bus. Each network device includes a communications interface having a transmitter 22 for transmitting signals from a respective network device 18, and a receiver 24 for receiving signals on behalf of the network device from the network bus. The transmitter and receiver can comprise any of a number of different elements, as such are known. Additionally, whereas the transmitter and receiver can be separate elements, as illustrated, a single transceiver can be used to perform the functions of both the transmitter and the receiver.

Typically, the network device 18 transmits signals to the network bus 12 and receives signals from the network bus through the transmitter 22 and receiver 24, respectively. To control the transmission of signals from the network device to the network bus 12 and the reception of signals to the network device from the network bus, the bus protection element includes at least one isolation switch 26 disposed between the transmitter and the receiver and the network bus. Further, to control the transmission of signals from the network device to the network bus without controlling the reception of signals to the network device, the bus protection element includes at least one separation switch 27. The isolation switches act to controllably halt the transmission of signals from the network device onto the network bus and the reception of signals to the network device from the network bus. And the isolation switches and/or separation switches can controllably halt the transmission of signals from the network device onto the network bus without preventing the network device from receiving signals, such as a Reset command, from the network bus. Whereas the isolation switches and separation switches can comprise any of a number of different elements, in a preferred embodiment the isolation switches comprise field effect transistors (FETs). Typically, the isolation switches and separation switches operate in either an on mode wherein the isolation switches and separation switches permit the network device to transmit signals to the bus. In contrast, the isolation switches and separation switches can operate in an off mode where, if either is operating in the off mode, the respective switches prevent the network device from transmitting signals to the bus. Further, if the isolation switches are operating in the off mode, the isolation switches prevent the network device from receiving signals from the bus. In this regard, FETs provide a very high impedance when in the off mode to thereby halt the transmission of signals, and a very low impedance when in the on mode to thereby permit the transmission of signals. For another embodiment of the bus protection element, see FIG. 2B.

The bus protection element also includes a logic element 28 electrically connected to the isolation switches 26, the transmitter 22 and the receiver 24. The logic element can comprise any number of different components and can be comprised of hardware, software or firmware, but typically comprises a state machine implemented as an application specific integrated circuit (ASIC) or a field programmable gate array (FPGA). The logic element is preferably included within the network device interface 16 associated with the network device 18, but the logic element can be a separate element. Regardless of whether the logic element is included within the network device element or a separate element, the logic element can be electrically isolated from the components of the network device interface and from the network device, such as in an isolated section of the network device interface or a separate element isolated from the network device interface and the network device. In this regard, the logic element will not be affected by any failure in the network device interface or the network device.

The logic element 28 is capable of monitoring the signals transmitted by the network device 18 and identifying improper signals. The logic element can identify any of a number of various improper signals but, in a preferred embodiment, the bus protection element identifies the signals transmitted as improper if the signals consist of improper signals transmitted independent of signals received by the network device (e.g., signals transmitted that are not in response to a command from the network controller 14), improperly formatted signals transmitted by the network device, improper signals transmitted in response to signals received by the network device, and/or improperly long single-state signals transmitted by the network device (e.g., an improperly long logic one state or logic zero state), as described below.

If the logic element 28 identifies a predefined number of improper signals, the logic element can controllably operate the isolation switches 26 and/or the separation switches 27 to thereby halt signals transmitted by the network device 18, typically by placing the isolation switches an/or separation switches in the off mode. In order to be somewhat fault tolerant, the logic element can allow a predefined number of improper signals to pass to the network bus 12 before isolating the respective network device from the network bus, such as allowing three improper signals before placing the isolation switches in the off mode. Allowing for the predefined number of improper signals prevents the logic element from unnecessarily isolating the respective network device from the network if an improper signal is infrequently transmitted from the network device. Additionally, or alternatively, the predefined number of improper signals can be dependent upon a predetermined number of signals transmitted by the network device. For example, the logic element can allow the network device to transmit three improper signals for every one hundred signals transmitted to the network bus.

Although not required for the system 10 to protect the communications conducted via the network bus 12, the bus protection element can further include diagnostic switches 30, disposed between the transmitter 22 and the network device 18, that allows the logic element 28 to perform a diagnostic check if the predefined number of improper signals are identified. The diagnostic switches can controllably halt the transmission of signals from the network device to the transmitter, and typically operate in either an on mode during normal operation of the system wherein the diagnostic switches permit the respective network device to transmit signals to the transmitter, or an off mode wherein the diagnostic switches prevent the respective network device from transmitting signals to the transmitter. The diagnostic switches can comprise any of a number of elements but, in a preferred embodiment, comprise FETs.

If the logic element 28 identifies the predefined number of improper transmitted signals, the logic element can operate the diagnostic switches 30, as well as operate the isolation switches 26, typically by placing the diagnostic switches and the isolation switches in the off mode. The logic element can operate the diagnostic switches to perform the diagnostic check after identifying the predefined number of any of the various improper signals but, in a preferred embodiment, the bus protection element operates the diagnostic switches to perform the diagnostic check after identifying the predefined number of improperly long single-state signals transmitted by the network device 18.

After the logic element operates the diagnostic switches and the isolation switches, the logic element can perform the diagnostic check to determine whether the respective network device or respective transmitter 22 are malfunctioning or whether another network device or transmitter on the network is malfunctioning, as described below. In other words, the diagnostic check determines if the network device or the transmitter that has been isolated from the network bus are malfunctioning, or if the improper signals transmitted by the respective network device are really the product of another network device since the respective network device functions normally once removed from the network bus. And if another network device or transmitter is malfunctioning, then their respective bus protection element should act to protect the network bus 12 from the respective improper signals since the system 10 preferably contemplates that a bus protection element will be associated with each network device.

Referring now to FIGS. 3A and 3B, upon initialization of the system 10, the isolation switches 26, separation switches 27 and diagnostic switches 30 operate to allow the network device 18 to transmit signals to the transmitter 22, and allow the transmitter to transmit signals to the network bus 12 (block 40). As the transmitter transmits signals to the network bus, the logic element monitors the signals to thereby identify the improper signals (blocks 42, 44). To identify improper signals transmitted independent of signals received by the network device, the logic element 28 monitors the receiver 24 and the transmitter 22 to ensure the signals transmitted are preceded by signals received by the receiver (FIG. 3B, block 50). In this regard, the network devices are configured to transmit signals only after receiving a command signal, such as from the network controller 14. Therefore, the logic element monitors the receiver for a signal and, once a signal has been received, determines whether the signal is a command signal expecting a response from the network device (blocks 52, 54). If received signal is not a command signal expecting a response, any signal transmitted by the remote device is an improper signal (block 56).

To identify improperly formatted signals transmitted by the network device 18, the logic element 28 identifies and interprets the signals transmitted to compare the format of the signals transmitted with the format of the protocol utilized by the network controller 14 and network devices to communicate, such as the BiSenSys or UART compatible protocols described by U.S. patent application Ser. No. 09/736,878 (block 58). For example, the BiSenSys protocol consists of either a command sync pulse (including one and one half bit length high followed by one and one half bit length low) or data sync pulse (including one and one half bit length low followed by one and one half bit length high), plus a 17 bi-phase bit argument and a bi-phase parity bit.

The logic element 28 identifies improper signals transmitted in response to command signals received by the network device 18 by monitoring the signals received by the receiver 24. After the logic element has identified and interpreted the received signals according to the appropriate protocol, the logic element determines if the signals transmitted are proper based upon the interpreted signals received by the receiver and further based upon applicable protocol standards.

In order to identify proper signals based upon applicable protocol standards, the logic element 28, can include diagnostic logic of various sophistications. In this regard, the logic element can monitor the incoming command signals according to a method such as that disclosed in U.S. patent application Ser. No. 09/736,878. The method disclosed in U.S. patent application Ser. No. 09/736,878 includes a small instruction set particularly suited for miniature embedded logic systems. By incorporating such a small instruction set, the diagnostic logic required to monitor for proper responses to specific commands is diminutive. As previously described, the logic element can identify improper signals by detecting improper signals transmitted without an accompanying received signal (blocks 52, 54). Additionally, or alternatively, the logic element can identify improper signals by detecting improperly formatted signals from the network device 18 in response to an appropriate command signal (block 60), as well as the improper use of a parity bit within the transmitted signal (block 62).

Also, the logic element 28 can identify improper signals by determining if the signal transmitted includes the proper number of data words (blocks 64, 66), or if the transmit enable line has been properly released once transmission of a response signal has been completed (block 68). For example, if the network device 18 received a Read In-Data Word command signal, the logic element would look for the network device to transmit a one word signal. Since the logic element may not be sophisticated enough to know the address of the network device the logic element is protecting, the logic element will not know if the network device the logic element is monitoring will transmit a response signal. But if the network device does transmit a response signal, the network device should only respond with a one word response signal in the proper format.

Another improper signal identified by the logic element 28, improperly long single-state signals transmitted by the network device 18 (e.g., an excessively long dormant or recessive state identified on the network bus 12), indicates that the transmitter 22 may be stuck in a dormant state due to either a stuck enable line from the network device (or, more particularly, the network device interface 16) or a malfunction in the transmitter. To identify improperly long single-state signals transmitted by the network device, the logic element monitors the signals received by the receiver 24 for a single-state signal longer than that allowed by the logic element. In this regard, the network of some embodiments is an actively terminated network such that when no signals are present on the network bus, the network bus is pulled into a biased state, i.e., a tri-state, that can be interpreted by the logic element as an excessively long single-state signal received by the receiver. Thus, to identify a single-state signal as improper as opposed to a mere lack of signals on the network bus, the network controller 14 may have to be configured to issue a continuous stream of signals to maintain traffic on the network bus. As such, a stuck enable line or a malfunctioning transmitter can be identified by the lack of signals on the network bus.

After identifying a transmitted signal as improper, the logic element 28 will determine if the predefined number of improper signals have been identified and, if so, the logic element will operate the isolation switches 26 to protect the network bus 12 from further improper signals transmitted by the transmitter 22 to the network bus, typically by placing the isolation switches in the off mode (FIG. 3A, blocks 46, 48). After the logic element places the isolation switches in the off mode, the logic element can perform a diagnostic check of the transmitter and receiver 24, as described below. If no diagnostic check is to be performed, however, instead of operating the isolation switches in the off mode, the logic element will generally operate separation switches 27 to isolate the transmitter of the respective network device 18 from the network bus while still allowing the receiver 24 of the respective network device to receive signals. The transmitter of respective network device will typically remain unable to transmit signals to the network bus until a reset condition is executed in the network, such as a Reset command sent from the network controller 14 or the network device completing a power cycle. In addition to the reset condition allowing the network device to transmit signals to the network bus, the logic element can operate the isolation switches to allow the transmission of signals from the network device after performing a diagnostic check and determining that the respective network device is, in fact, functioning properly, such as is described below.

Referring now to FIG. 2A and FIG. 3C, if so desired, the logic element 28 can operate the diagnostic switches 30 to perform a diagnostic check of the transmitter 22 and receiver 24 after identifying the predefined number of improper transmitted signals and, most commonly, after identifying the predefined number of improperly long single-state signals transmitted by the network device 18. In this regard, after the logic element has operated the isolation switches 26, the logic element will operate the diagnostic switches, such as by placing the diagnostic switches in the off mode, to thereby prevent the respective network device from transmitting signals to the transmitter 22 (block 70).

After the logic element 28 isolates the transmitter from the network device 18, the logic element transmits a set of diagnostic signals to the transmitter 22, such as a known pattern of signals (block 72). Once the diagnostic signals have been transmitted to the transmitter, the logic element receives corresponding return signals from the receiver 24 (block 74). In this regard, the transmitter and the receiver are in electrical communication, such as in the case of the network bus 12 operating in a half-duplex mode.

Referring to FIG. 4A, some network bus 12 configurations include separate pairs of conductors for the transmitter 22 and the receiver 24, such as when the network bus is operating in a full-duplex mode. In embodiments wherein the network bus includes separate pairs of conductors, separation switches 27 are connected to the pair of conductors connected to the transmitter to thereby halt the transmission of signals from the respective network device to the network bus when the predefined number of improper signals are identified. But to perform the diagnostic check after halting the transmission of signals, the bus protection element also includes the isolation switches 26 connected to the receiver to isolate the receiver from the network bus and, thus, allow the receiver to receive signals from the transmitter during the diagnostic check without interference from the signals on the network bus. Additionally, because the transmitter and receiver are not in electrical communication during normal operation, the bus protection element of this embodiment includes a pair of connecting switches 32 to place the transmitter and receiver in electrical communication during the diagnostic check. The connecting switches can consist of a variety of different types of switches but, preferably, consist of FETs.

Regardless of the configuration of the bus protection element, once the logic element 28 has received the corresponding return signals, the logic element can compare the return signals to the known diagnostic signals (block 76). If the return signals are substantially different than the diagnostic signals, the logic element can operate the separation switches 27 in the off mode and operate the isolation switches 26 in the on mode, while continuing to operate the diagnostic switch 30 in the off mode (block 77). As such, the logic element can prevent the transmitter 22 from transmitting signals to the network bus 12 while allowing the receiver 24 to receive signals, such as a reset command, from the network bus. In this regard, the difference in the signals is indicative of a malfunction in the network device 18 and/or the transmitter 22. As such, the logic element performs the diagnostic check to determine whether its respective network device 18 or transmitter 22 are malfunctioning, or whether another network device or transmitter on the network are malfunctioning and causing the respective network device to issue seemingly improper signals. If the respective network device and transmitter are not malfunctioning, the return signals and diagnostic signals will be substantially identical, and the logic element will operate the isolation and diagnostic switches to thereby permit the respective network device to transmit signals to the network bus 12, such as by placing the isolation and diagnostic switches in the on mode (block 78). In this regard, the bus protection element associated with the malfunctioning network device or transmitter will act to protect the network bus from the improper signals. For another embodiment of the bus protection element where the network bus includes separate pairs of conductors, see FIG. 4B.

According to aspect of the present invention, shown in FIG. 5, the system 10 includes a network bus 12 that extends between a pair of network controllers. Thus, a first network controller 14a is electrically connected to a first end of the network bus, while a second network controller 14b is electrically connected to the second end of the network bus. In the illustrated embodiment, the first and second network controllers are co-located such that the network bus forms a loop between the pair of network controllers. The two network controllers 14a and 14b are shown as separate devices for purposes of illustration, but it should be understood that the two network controllers can be embodied in a single device. Also, as will be apparent, whereas the network controllers are illustrated as located at ends of the network bus, the network controllers can be located at different positions from one another, if so desired. Irrespective of whether the network controllers are embodied in a single device and whether the network controllers are located at ends of the network bus, the two network controllers are preferably connected to each other so that the network controllers have a dedicated communication link with each other. The network controllers can be connected to each other according to any of a number of different known methods, including a link 79 through the host computer 20 or a separate link 81 between the network controllers.

During ordinary operation of the embodiment of the system 10 depicted in FIG. 5, the first network controller 14a typically serves as a master controller and is responsible for issuing commands over the network bus 12. In contrast, the second network controller 14b is generally a slave controller that monitors the network bus so as to detect the various commands issued by the first network controller and the responses provided by the network devices 18. The second network controller is preferably capable of issuing commands and the second network controller may actually be required to assume control of a portion of the network bus in the event of a bus failure, as described hereinbelow.

In order to prevent undesirable reflections of the signals transmitted via the network bus 12, the opposed ends of the network bus are preferably properly terminated. In this regard, the ends of the network bus are preferably terminated by a termination element having an impedance that matches the characteristic impedance of the network bus. In one embodiment in which the network bus consists of several pairs of wires, a respective termination element is placed across each pair of wires at each of the opposed ends of the network bus. The characteristic impedance of the network bus is typically resistive, such that the termination element is also typically a resistor. By way of example, the network bus generally has a characteristic impedance of about 100-120 ohms, with a Category 5 Ethernet bus having a characteristic impedance of 100 ohms. As such, each resistor placed across a pair of wires preferably has the same resistance in order to appropriately terminate the network bus and prevent undesirable reflections.

Where the network controllers 14a, 14b are connected to opposite ends of the network bus 12, the network controllers preferably include the termination elements. As depicted in FIG. 6, for example, the network controllers can be designed to communicate with a network bus that includes a power bus (designated power + and power −) and three pairs of conductors (designated pairs 1, 2 and 3). As such, the network bus of this illustrated embodiment is designed for full duplex communications over the first and second pairs of conductors. A clock signal can also be provided, if necessary, via the third pair of conductors. While the system 10 can be configured in a variety of different manners without departing from the spirit and scope of the present invention, the first network controller serves as the master controller in accordance with one embodiment and therefore includes a transmitter 82 connected to the first pair of conductors for transmitting commands via the first pair of conductors. In order to receive the responses from the network devices 18, the first network controller also includes a receiver 84 connected to the second pair of conductors. In addition, the first network controller of this embodiment includes a transmitter 86 connected to the third pair of conductors for transmitting a clock signal, if necessary. In this embodiment, the second network controller is a slave controller that is primarily designed to receive the signals transmitted by the first network controller and the network devices. Thus, the second network controller includes receivers 88 connected to each of the three pairs of conductors. Since the second network controller is designed, however, to control at least a portion of a network bus in the event of a bus failure as described in detail below, the second network controller of this embodiment also includes a transmitter 90 connected to the first pair of conductors for transmitting commands via the first pair of conductors, and a transmitter 92 connected to the third pair of conductors for transmitting a clock signal, if necessary. In order to properly terminate each pair of conductors, the termination elements 80, such as a resistor having a resistance that matches the characteristic resistance of the network bus, are connected across the pairs of conductors, as shown in FIG. 6. The termination elements therefore prevent undesirable reflections.

According to this aspect of the present invention, a bus protection element 94 is preferably associated with each network device 18. For example, the bus protection element may be integral to a respective network device. In one advantageous embodiment, however, a network device interface 22 is associated with each network device and includes the bus protection element. It should be understood, however, that the bus protection element can be independent of a network device interface, if so desired. Regardless of its implementation, each bus protection element is adapted to selectively connect at least one network device to the network bus 12. Although a bus protection element can be configured in a number of different manners, one advantageous embodiment of a bus protection element is depicted in FIG. 7 and is described in detail hereinafter. In this embodiment, the bus protection element is disposed in electrical connection to the network bus. In particular, the bus protection element is disposed in electrical connection with the power bus and with each pair of conductors of the network bus.

As described below, each bus protection element 94 of this aspect of the present invention includes a number of switches for connecting the associated network device 18 to the network bus 12. Prior to power being applied to the system 10, the nominal position of each of the switches of the bus protection element is in the open position. As such, the network devices with which the bus protection elements are associated will not be connected to the network bus. Upon initialization of the system 10, the network controllers 14a, 14b apply power via the power bus. In the embodiment of FIG. 5 in which the system includes first and second network controllers, power is preferably applied by both the first and second network controllers from opposite ends of the network bus.

Each bus protection element 94 includes a power detector 96 for detecting the application of power to the power bus. While a variety of power detectors can be employed, one embodiment of a power detector is depicted in FIG. 8A. In this embodiment, the power detector includes a mechanical relay that is normally open. Upon the application of power to the power bus, the mechanical relay will close, thereby providing power to the network device(s) 18 associated with the bus protection element. It will be understood, however, that the bus protection element can include other types of power detectors and switches. For example, the power detector can be designed to include a charge pump and a solid state switch, such as an n-channel MOSFET, as shown in FIG. 8B. Regardless of the type of power detector, the bus protection element typically includes a power switch 110 in-line with the power bus and controlled by the first power detector so as to be closed upon the detection of power by the power detector.

As shown in FIG. 7, the bus protection element 94 of this embodiment also includes a first set of switches 98 in-line with each conductor of the network bus, other than the power bus. The first set of switches are also normally open. However, the first set of switches are controlled by the power detector 96 so as to be closed once the power detector detects that power has been applied to the power bus and begins to conduct. Since the network device 18 associated with the bus protection element is connected to the network bus downstream of the first set of switches, the closure of the first set of switches permits the network device to receive commands and clock signals from the network controller and to transmit responses or data in reply thereto. In the full duplex configuration depicted in FIG. 7, for example, the network device is connected to the first and third pairs of conductors by means of first and second receivers 100 for receiving commands and clock signals, respectively. Similarly, the network device is connected to the second pair of conductors by a transmitter 102 for transmitting responses or data via the second pair of conductors to the network controller or to other network devices.

While the network device 18 can be connected directly to the network bus 12, the bus protection element 94 of the illustrated embodiment includes a logic element 103 for performing the various functions of the bus protection element as described below. Moreover, the logic element of the bus protection element of the illustrated device is designed to receive signals from and transmit signals to the network bus as also described below. Thus, the receivers 100 and the transmitter 102 are connected to the logic element which, in turn, is connected to the network device. Additionally, the logic element of this embodiment may also serve to connect the network device to the power bus. It should be understood that while FIG. 7 depicts the logic element in a hardware block diagram, the logic element can also be comprised of software or firmware.

According to this aspect of the present invention, each bus protection element 94 also includes a termination element 104 switchably connected across the network bus 12 and, in particular, across each pair of conductors of the network bus, other than the power bus. As such, the bus protection element preferably includes the same number of termination elements as the number of pairs of conductors. In the embodiment depicted in FIG. 7, for example, the bus protection element preferably includes three termination elements that can be switchably connected across the first, second and third pairs of conductors, respectively.

As shown in FIG. 7, each termination element 104 preferably extends across a pair of conductors in series with a normally open switch 106 such that the termination element is not normally connected across the network bus. Upon the application of power to the power bus and the detection of power by the power detector 96, however, the power detector will direct the switches associated with each of the termination elements to close, thereby placing the termination elements across respective pairs of the conductors. While the power detector could directly control the switches associated with the termination elements, the bus protection element of the illustrated embodiment directs the output of the power detector to the logic element 103 which, in turn, issues a signal causing the switches associated with each of the termination elements to close. Since the switches associated with the termination elements are not directly connected to a specific power detector, the switches can be responsive to either power detector, via the logic element, to facilitate the symmetrical operation of the bus protection element as described below. As described above, each termination element preferably has an impedance that matches the characteristic impedance of the network bus 12 in order to prevent reflections. Since the characteristic impedance of the network bus is typically resistive, the termination element is typically a resistor as shown in FIG. 7. While each termination element is commonly placed across a respective pair of conductors as shown in FIG. 7, the termination element may be an active termination element as known to those skilled in the art, if so desired.

By closing the first set of switches 98 to connect the network device(s) 18 associated with the bus protection element 94 to the network bus 12 concurrent with the switchable connection of the termination elements 104 across the respective pairs of conductors of the network bus, the system 10 of the present invention and, more particularly, the bus protection element permits the associated network device(s) to communicate via the network bus while reducing, if not eliminating, undesirable reflections.

During the power-up sequence prior to commencing operations, the master controller will issue a command, typically termed "Identify," requesting that the respective network device 18 to which power is being applied provide a response identifying itself. Once the power detector 96 of a bus protection element 94 has detected that power has been applied to the power bus and has closed the first set of switches 98 and switchably connected the termination elements 104 to the respective pairs of conductors, the network device and, more commonly, the network device interface 22 or the logic element 103 of the bus protection element in embodiments that do not include a network device interface will transmit a response to the network controllers identifying the respective network device.

Upon receiving the response identifying the network device 18, the master controller will generally issue a command termed "Connect" informing the bus protection element 94 associated with the current network device that the system 10 will attempt to connect to the next network device on the network bus 12. In response to the Connect command, the bus protection element will close a second set of switches 108 that are also in-line with each conductor of the network bus, other than the power bus. As shown in FIG. 7, for example, the first and second sets of switches are preferably disposed on opposite sides of the termination elements 104 and on opposite sides of the point at which the network device is connected to the network bus. Thus, the first and second pairs of switches control the connection of the associated network device(s) and the termination elements to the network bus. In response to the Connect command, the bus protection element will also preferably close a power switch 110 disposed in-line with the power bus in order to permit power to be applied to the next network device and, in particular, to the bus protection element associated with the next network device along the network bus.

While the bus protection element 94 can include a relatively simple power switch 110 in-line with the power bus, the bus protection element oftentimes includes a second power detector 96 which controls the power switch. In these instances, the second power detector is preferably identical to the first power detector. It should be noted, however, that the normally open switch of the second power detector is closed, not due to the detection of power on the power bus since the second power detector is connected to the power bus downstream of the power switch at a point that has not yet received power, but due to a control signal provided by the logic element 103, as shown in both FIGS. 7 and 8. Including a second power detector is advantageous for systems 10 configured as depicted in FIG. 5 in which the bus protection element could receive power from either direction, i.e., from either network controller. Thus, the bus protection element is preferably designed to be symmetrical so as to operate equally as well in response to power and other signals, such as commands and clock signals, being supplied from either direction along the network bus.

In addition to closing the power switch 110 and the second set of switches 108, the logic element 103 causes the termination elements 104 to be switchably disconnected from the respective pairs of conductors in response to the Connect command so as no longer to terminate the pairs of conductors. As such, the network controller can communicate with network devices located further downstream along the network bus 12. The process of applying power to the power bus and individually connecting each network device 18 to the network bus 12 via a respective bus protection element 94 is preferably continued until each of the network devices is connected to the network bus. The network controller and the network devices then communicate as described in general above.

Before, during or following initialization, the network bus 12 may suffer a bus failure, such as an open circuit, short circuit, monopolization by a network device 18 that is babbling, or the like. As will be understood, various types of network failures can create each of these conditions. The network controllers 14a, 14b and/or a host computer 20 associated with the network controllers are adapted to detect the bus failure. For purposes of description, however, the network controllers will be described as detecting the bus failure, even though the detection may actually be performed by the associated host computer, either individually or in combination with the network controllers. In this regard, the network controllers can detect a short circuit or an open circuit on the first or third pairs of conductors if the second network controller does not receive the signals transmitted by the first network controller. The network controllers can also detect an open circuit on the second pair of conductors since signals transmitted by the network devices will be detected by only one of the network controllers. Similarly, the network controllers can detect a short circuit in the second pair of conductors since the signals transmitted by the network devices will be received by only one, if any, of the network controllers.

The network controllers 14a, 14b will also be able to detect a network device 18 that is babbling since there will be signals transmitted by the babbling network device on the second pair of conductors that are not in response to a command issued by the network controllers. In addition, the network controllers can detect a short circuit in the power bus or within a network device by detecting a current being carried by the power bus that exceeds a predetermined threshold. In addition, the network controllers can detect an open circuit in the power bus during the process of initially applying power to the network bus since power will not be transferred from one network device on one side of the open circuit to the adjacent network device on the other side of the open circuit and, thus, the network device without power will not be able to respond to the network.

While techniques for detecting the various types of bus failures according to this aspect of the present invention have been described in conjunction with a network bus 12 having a full duplex configuration, similar techniques may be employed in conjunction with a network bus having a half duplex configuration. In addition, while techniques for identifying the various types of bus failures have been described in conjunction with a system having a pair of network controllers, similar techniques can be employed in conjunction with other embodiments of the system, such as embodiments that have only a single network controller. In this regard, failures in the power bus and the second pair of conductors are detected in the same manner as described above, while failures in the first and third pairs of conductors are detected by a failure of the network controller to receive the same signals that it is transmitting since the signals transmitted by the network controller over the network bus during normal operation should be returned to the network controller.

If the network controllers 14a, 14b detect a bus failure, the network controllers remove power from the network bus 12. As such, the power detectors 96 of each bus protection element 94 detect that power has been removed and allow the associated switch to return to its normally open position. Likewise, the power detectors signal the other switches of the bus protection element that power has been removed such that each of these other switches, i.e., the first and second sets of switches 98, 108 and the switches 106 associated with the termination elements 104, also return to their normally open position.

As illustrated in the embodiment in which the system 10 includes a pair of network controllers 14a, 14b connected to opposite ends of the network bus 12, the first network controller then applies power to the power bus and monitors the signals transmitted via the network bus as a network device 18 is connected to the network bus via its respective bus protection element 94. Since the network bus is properly terminated by the termination elements 104 while each respective network device is initially connected to the network bus, the first network controller will be able to communicate with each network device until an attempt is made to connect to another network device that is located on the far side of an open or short circuit or until an attempt is made to connect to a network device that is babbling or shorted. In this regard, while the network device that is positioned closest to the location of the bus failure and on the same side of the bus failure as the first network controller will properly connect to the network bus and communicate with the first network controller, any attempt to connect to the next network device will be unsuccessful and/or will corrupt the network bus.

By connecting the network devices 18 one at a time in the order which the network devices are connected to the network bus 12, the first network controller 14a can identify the location of the bus failure. As shown in FIG. 9, for example, bus failure typically separates the network bus into first and second portions 12a, 12b located on opposite sides of the location of the bus failure. While the first and second portions are no longer in direct communication with one another, the first portion of the network bus remains in communication with the first network controller 14a, while the second portion of the network bus is in communication with the second network controller 14b. While FIG. 9 depicts a break in the network bus, such as resulting from an open circuit, the failure could also be a short circuit in one or more conductors of the network bus or a network device that has begun babbling as described above. Each of these types of failure effectively separates the network bus into first and second portions.

Once the first network controller 14a has identified the location of the bus failure, the second network controller 14b is promoted to be a master controller so as to issue commands and to transmit a clock signal, if so desired. The second network controller then repeats the process previously conducted by the first network controller, albeit with the network devices connected to the second portion 12b of the network bus 12. Thus, the second network controller also identifies the location of the bus failure as well as the network device that is closest to the location of the bus failure on the same side as the second network controller that can still be properly connected to the network bus. Although the process of inventorying the network devices connected to the first and second portions of the network bus is described to first be conducted by the first network controller and then by the second network controller, it should be understood that both network controllers could, instead, proceed concurrently.

Once the location of the bus failure has been identified by the first and second network controllers 14a, 14b, the first and second network controllers again remove power from the power bus and then sequentially connect each network device 18 to the network bus 12 via its respective bus protection element 94. In this regard, the first and second network controllers connect the network devices to the network bus in the order in which the network devices are positioned along the network bus beginning with the network device that is located closest to the respective network controller and continuing thereafter. Upon applying power to and establishing communication with the network device that is located closest to the bus failure but that is still capable of being properly connected to the network bus, each network controller halts the connection process by failing to issue another Connect command. Thus, the network controller does not attempt to connect to the next network device since it was previously determined that attempts to make a further connection will be futile in view of the bus failure.

Since the network controllers 14a, 14b do not issue another Connect command after connecting the network device 18 that is located closest to the bus failure to the network bus 12 (the network devices designated S4 and S5 in FIG. 9), the termination elements 104 of the bus protection element 94 associated with the network device that is located closest to the bus failure will remain across the various pairs of conductors of the network bus, thereby effectively terminating the network bus. As a result of the termination of the first and second portions of the network bus proximate the location of the bus failure, the first network controller 14a can reliably communicate with the network devices 18 connected to the first portion 12a of the network bus without undesirable reflections, while the second network controller 14b can reliably communicate with the network devices connected to the second portion 12b of the network bus without undesirable reflections. As such, both the first and second controllers must now issue commands over the respective portions of the network bus and must monitor the resulting responses provided by the network devices. In this regard, in order to poll the network devices in the same sequence as set forth above in Table 1, the first and second network controllers must now each issue commands to the respective portion of the network bus as set forth in the following table.

| First Network controller | Second Network controller |
| --- | --- |
| Trigger | Trigger |
| Poll S1 | Poll S5 |
| Poll S2 | |
| Trigger | Trigger |
| Poll S1 | Poll S6 |
| Poll S3 | Poll S7 |
| Poll S4 | Poll S8 |

It will be understood that the commands need not be split among the network controllers as illustrated in Table 2. In this regard, each network controller can issue the entire set of commands to respective portions of the network bus, however, network devices connected to the first portion of the network bus will not respond to commands issued by the second network controller, and vice versa.

As shown in Table 2, each network controller issues a trigger command over the respective portion of the network bus 12. In response to the initial trigger command from the first network controller 14a, the network devices designated S1 and S2 are polled for stored data, while in response to the initial trigger command from the second network controller 14b, the network device designated S5 is polled for stored data. In response to the second trigger command from the first network controller, the network devices designated S1, S3 and S4 are polled for stored data, while in response to the second trigger command from the second network controller, the network devices designated S6-S8 are polled for stored data. Thus, the system 10 remains fully functional even though the network bus has failed.

While a system 10 employing a network bus 12 that extends between a pair of network controllers 14a, 14b has been illustrated and described, the system and method of the present invention are suitable for a wide variety of other network bus architectures. For example, the system can include a network bus having a single network controller connected to the network bus, either at one end of the network bus or at any point along the network bus as depicted in FIG. 1. In this embodiment, a failure along the network bus would effectively prevent the network controller from further communicating with the network devices 18 that are connected to the portion of the network bus on the opposite or distant side of the bus failure from the network controller. However, the network controller could still communicate with the network devices connected to the same portion of the network bus to which the network controller is connected.

In order to continue to communicate with these network devices 18 at a relative high data transfer rate, however, the network controller 14a would again inventory the network devices connected to the remaining portion of the network bus and identify the network device connected to the remaining portion of the network bus and located closest to the bus failure. As described above, each network device is associated with a bus protection element 94 that has an associated termination element 104. As such, the network controller commands the bus protection element associated with the network device connected to the remaining portion of the network bus and located closest to the bus failure to place the termination elements across the respective pairs of conductors. As such, the network controller can continue to communicate with the network devices connected to the remaining portion of the network bus at a relatively high data transfer rate without suffering from reflections or other noise introduced via the bus failure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for maintaining proper termination and error-free communication in a network bus including a power bus comprising:

at least one network device electrically connected to and adapted to communicate via said network bus, wherein said at least one network device is configured to transmit signals to said network bus, and configured to receive signals from said network bus; and a network controller electrically connected to said network bus, wherein said network controller is adapted to direct communications with said at least one network device via said network bus, and wherein said network controller is adapted to provide power signals to said at least one network device via the power bus of the network bus; and at least one bus protection element disposed between said at least one network device and the network bus, wherein each bus protection element comprises:

at least one isolation switch disposed between a respective network device and the bus, wherein said at least one isolation switch is configured to controllably halt the transmission of signals from the respective network device onto the bus; and a logic element electrically connected to said at least one isolation switch and the respective network device and configured to monitor signals on the network bus to thereby identify improper signals on the network bus, including being configured to receive signals transmitted from the respective network device to said network bus and determine when any of the respective signals are improper signals, and wherein said logic element is configured to controllably operate said at least one isolation switch to selectively connect and disconnect the respective network device to and from the network bus based upon said logic element identifying a predefined number of improper signal.

2. A system according to claim 1, wherein said at least one bus protection element is configured to monitor the signals transmitted by said at least one network device and the signals received by said at least one network device, wherein said at least one bus protection element is configured to identify improper signals transmitted by said at least one network device and controllably halt the transmission of signals from respective network devices onto the network bus if a predefined number of improper signals are identified.

3. A system according to claim 2, wherein each network device includes a communications interface comprising:
   a transmitter configured to transmit signals from the network device to the network bus; and
   a receiver configured to receive signals on behalf of the network device from the network bus,
   wherein said at least one bus protection element is configured to monitor the signals transmitted by the transmitter and the signals received by the receiver.

4. A system according to claim 3 further comprising:
   at least one diagnostic switch electrically connected to and disposed between the at least one transmitter and said at least one network device, wherein said at least one diagnostic switch is electrically connected to said at least one bus protection element, and wherein said at least one diagnostic switch is configured to controllably halt the transmission of signals from a respective network device to the respective transmitter,
   wherein each bus protection element is configured to controllably operate a respective diagnostic switch if a predefined number of improper transmitted signals are identified, the transmitter and receiver associated with a respective network device are electrically connected such that after the bus protection element controllably operates the respective diagnostic switch to halt the transmission of signals from the respective network device the bus protection element is configured to transmit diagnostic signals and receive corresponding return signals, and wherein the bus protection element is configured to compare the diagnostic signals and the return signals such that when the diagnostic signals and the return signals are substantially identical the bus protection element is configured to controllably operate the respective at least one isolation switch and the respective diagnostic switch to permit the transmission of signals from the respective network device.

5. A method for maintaining proper termination and error-free communication conducted via a network bus that is electrically connected to at least one network device, wherein the network bus includes a power bus, said method comprising:
   providing at least one bus protection element disposed between the at least one network device and the network bus, each of the at least one bus protection element including at least one isolation switch configured to controllably halt the transmission of signals from a respective network device onto the bus;
   monitoring signals on the network bus, including receiving signals transmitted from the at least one network device to the network bus and determining when any of the respective signals are improper signals;
   identifying a predefined number of improper signals from the received signals; and
   controllably operating the at least one isolation switch to switchably disconnect at least one network device after identifying a predefined number of improper signals transmitted from the respective at least one network device.

6. A method according to claim 5, wherein monitoring comprises monitoring signals transmitted by the at least one network device to the network bus and the signals received by the at least one network device from the network bus, wherein identifying comprises identifying a predefined number of improper signals from the signals transmitted by the at least one network device to the network bus, and wherein switchably disconnecting comprises halting the transmission of signals from the at least one network device after identifying the predefined number of improper signals.

7. A method according to claim 6, wherein each network device includes a transmitter for transmitting signals from the network device to the network bus, and a receiver for receiving signals on behalf of the network device from the network bus, wherein each respective transmitter and receiver are electrically connected, said method further comprising:
   transmitting diagnostic signals through the respective transmitter and thereafter receiving corresponding return signals from the respective receiver after halting the transmission of signals from the respective network device;
   comparing the diagnostic signals and the return signals; and
   permitting the transmission of signals from the respective network device to the network bus, wherein said permitting the transmission of signals comprises permitting the transmission of signals when the diagnostic signals and the return signals are substantially identical.

8. An apparatus for operation with a network device electrically connected to and adapted to communicate via a bus, wherein the network device includes a communications interface having a transmitter configured to transmit signals from the network device to the bus, and a receiver configured to receive signals on behalf of the network device from the bus, said apparatus comprising:
   at least one isolation switch disposed between the communications interface and the bus, wherein said at least one isolation switch is configured to controllably halt the transmission of signals from the network device onto the bus; and
   a logic element electrically connected to said at least one isolation switch and the communications interface and configured to monitor the signals transmitted by the transmitter and the signals received by the receiver, wherein said logic element being configured to monitor the signals includes being configured to receive the signals transmitted by the transmitter and determine when any of the respective signals are improper signals to thereby identify improper signals transmitted by the transmitter, and wherein said logic element is configured to controllably operate said at least one isolation switch thereby halting the transmission of signals from the network device if a predefined number of improper transmitted signals are identified.

9. An apparatus according to claim 8, wherein the predefined number of improper signals is dependant upon a predetermined number of signals transmitted by the transmitter, and wherein said logic element is configured to identify the predetermined number of signals transmitted by the transmitter and controllably operate said at least one isolation switch thereby halting the transmission of signals from the network device if a predefined number of improper transmitted signals are identified.

10. An apparatus according to claim 8 further comprising: two diagnostic switches, wherein one diagnostic switch is disposed between the transmitter and the network device and the other diagnostic switch is disposed between the receiver and the network device, and wherein said diagnostic switches are configured to controllably halt the transmission of signals from the network device to the transmitter and the reception of signals by the network device from the receiver, wherein said logic element is configured to controllably operate said diagnostic switches if a predefined number of improper transmitted signals are identified, wherein the transmitter and receiver are electrically connected such that after said logic element controllably operates said diagnostic switches to halt the transmission of signals from the network device and the reception of signals by the network device said logic element is configured to transmit diagnostic signals through the transmitter and receive corresponding return signals from the receiver, and wherein said logic element is configured to compare the diagnostic signals and the return signals such that when the diagnostic signals and the return signals are substantially identical said logic element is configured to controllably operate said at least one isolation switch and said diagnostic switch to permit the transmission of signals from the network device to the bus via the transmitter.

11. An apparatus according to claim 8, wherein said at least one isolation switch operates in at least one of an on mode wherein said at least one isolation switch permits the network device to transmit signals to the bus, or an off mode wherein said at least one isolation switch prevents the network device from transmitting signals to the bus, and wherein said logic element is configured to controllably operate the mode of said at least one isolation switch.

12. An apparatus according to claim 11, wherein said logic element is configured to operate said at least one isolation switch in the on mode before identifying the predefined number of improper signals, and wherein said logic element is configured to place said at least one switch in the off mode after identifying the predefined number of improper signals.

13. An apparatus according to claim 12 further comprising:
a diagnostic switch disposed between the transmitter and the network device, wherein said diagnostic switch operates in at least one of an on mode wherein said diagnostic switch permits the network device to transmit signals to the transmitter, or an off mode wherein said at least one isolation switch prevents the network device from transmitting signals to the transmitter, wherein said logic element is configured to controllably operate said diagnostic switch in the on mode before identifying the predefined number of improper signals, wherein said logic element is configured to place said diagnostic switch in the off mode after identifying the predefined number of improper transmitted signals, wherein the transmitter and receiver are electrically connected such that after said logic element controllably places said diagnostic switch in the off mode said logic element is configured to transmit diagnostic signals through the transmitter and receive corresponding return signals from the receiver, and wherein said logic element is configured to compare the diagnostic signals and the return signals such that when the diagnostic signals and the return signals are substantially identical said logic element is configured to place said at least one isolation switch and said diagnostic switch in the on mode.

\* \* \* \* \*

UNITED STATES PATENT AND TRADEMARK OFFICE
CERTIFICATE OF CORRECTION

PATENT NO. : 7,581,031 B2
APPLICATION NO. : 10/475475
DATED : August 25, 2009
INVENTOR(S) : Konz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1442 days.

Signed and Sealed this

Fourteenth Day of September, 2010

David J. Kappos
*Director of the United States Patent and Trademark Office*